(12) United States Patent
Reusch

(10) Patent No.: US 12,390,955 B2
(45) Date of Patent: Aug. 19, 2025

(54) APPARATUS FOR ADDITIVE MANUFACTURING INCLUDING A BATCH MIXER FOR CEMENTITIOUS MATERIALS

(71) Applicant: James Lyman Reusch, Salt Lake City, UT (US)

(72) Inventor: James Lyman Reusch, Salt Lake City, UT (US)

( * ) Notice: Subject to any disclaimer, the term of this patent is extended or adjusted under 35 U.S.C. 154(b) by 0 days.

(21) Appl. No.: 18/551,750

(22) PCT Filed: Mar. 28, 2022

(86) PCT No.: PCT/US2022/022209
§ 371 (c)(1),
(2) Date: Sep. 21, 2023

(87) PCT Pub. No.: WO2022/204602
PCT Pub. Date: Sep. 29, 2022

(65) Prior Publication Data
US 2024/0165850 A1     May 23, 2024

(51) Int. Cl.
*B28B 1/00* (2006.01)
*B28C 5/10* (2006.01)
(Continued)

(52) U.S. Cl.
CPC ............... *B28B 1/001* (2013.01); *B28C 5/10* (2013.01); *B28C 7/0418* (2013.01); *B28C 7/06* (2013.01);
(Continued)

(58) Field of Classification Search
CPC ....... B28C 7/0404; B28C 7/04; B28C 7/0418; E04G 21/0418
See application file for complete search history.

(56) References Cited

U.S. PATENT DOCUMENTS 6,876,904 B2 * 4/2005 Oberg .................. B28C 7/0418
700/265
8,308,470 B2 * 11/2012 Khoshnevis .......... B29C 48/475
425/375
(Continued)

FOREIGN PATENT DOCUMENTS

| CN | 107665752 A | * | 2/2018 | ............. H01B 7/423 |
| CN | 108214924 A | * | 6/2018 | |
| CN | 210347290 U | * | 4/2020 | |

*Primary Examiner* — Benjamin A Schiffman
(74) *Attorney, Agent, or Firm* — Steven Rinehart

(57) ABSTRACT

An example apparatus for additive manufacturing can include a supply of dry cement powder (702) having an individually controllable outlet (704); a supply of a dry mineral filler (706) having an individually controllable outlet (708); a supply of a curing accelerator (712) having an individually controllable outlet (714); and a supply of water (716) having an individually controllable outlet (718). A batch mixer (722) can receive and mix a controlled amount dry cement powder from the supply of dry cement powder, a controlled amount of dry mineral filler from the supply of dry mineral filler, a controlled amount of curing accelerator from the supply of curing accelerator, and a controlled amount of water from the supply of water, thus forming a batch of cementitious material. A pump (750) can be connected to the batch mixer to pump the cementitious material. A delivery hose (150) can be connected to the pump to deliver the cementitious material pumped by the pump from the batch mixer. A printhead (502) can be connected to an outlet of the delivery hose. The printhead can be positionable in three-dimensional space.

15 Claims, 7 Drawing Sheets

(51) Int. Cl.
  *B28C 7/04* (2006.01)
  *B28C 7/06* (2006.01)
  *B33Y 40/00* (2020.01)
  *E04G 21/04* (2006.01)
  *B25J 9/02* (2006.01)
  *B25J 19/00* (2006.01)
  *B29C 64/106* (2017.01)
  *B29C 64/321* (2017.01)
  *B33Y 10/00* (2015.01)
  *B33Y 30/00* (2015.01)
  *B33Y 50/02* (2015.01)
  *B33Y 70/10* (2020.01)

(52) U.S. Cl.
  CPC .......... *B33Y 40/00* (2014.12); *E04G 21/0418* (2013.01); *E04G 21/0463* (2013.01); *B25J 9/026* (2013.01); *B25J 19/0025* (2013.01); *B29C 64/106* (2017.08); *B29C 64/321* (2017.08); *B33Y 10/00* (2014.12); *B33Y 30/00* (2014.12); *B33Y 50/02* (2014.12); *B33Y 70/10* (2020.01)

(56) References Cited

U.S. PATENT DOCUMENTS

| | | | |
|---|---|---|---|
| 10,307,959 B2 * | 6/2019 | Northrup | B29C 64/165 |
| 10,414,067 B2 * | 9/2019 | Datema | G06Q 50/08 |
| 2012/0230147 A1 * | 9/2012 | Heller | B01F 27/091 |
| | | | 366/141 |
| 2014/0252668 A1 * | 9/2014 | Austin | B28B 3/20 |
| | | | 425/375 |
| 2018/0071949 A1 * | 3/2018 | Giles | B28B 1/001 |
| 2018/0229435 A1 * | 8/2018 | Tyler | B29C 64/291 |
| 2020/0307017 A1 * | 10/2020 | Schubart | B28B 17/02 |
| 2022/0152868 A1 * | 5/2022 | Boon | B01F 27/071 |
| 2023/0033232 A1 * | 2/2023 | Staves | B28C 7/0409 |
| 2023/0134177 A1 * | 5/2023 | Reusch | B28B 17/0081 |
| | | | 425/143 |
| 2023/0256650 A1 * | 8/2023 | Koehler | C04B 18/12 |
| | | | 106/802 |
| 2024/0058986 A1 * | 2/2024 | Le Roux | B28C 9/002 |
| 2024/0123652 A1 * | 4/2024 | Qing | B28C 7/0418 |
| 2024/0183145 A1 * | 6/2024 | Nekkanti | B28B 11/001 |
| 2024/0300171 A1 * | 9/2024 | Reusch | B29C 64/209 |
| 2024/0342955 A1 * | 10/2024 | Cheniuntai | B33Y 40/00 |
| 2025/0092695 A1 * | 3/2025 | Le Roux | B28B 1/001 |
| 2025/0153394 A1 * | 5/2025 | Bourquin | B28C 7/026 |

* cited by examiner

APPARATUS FOR ADDITIVE MANUFACTURING INCLUDING A BATCH MIXER FOR CEMENTITIOUS MATERIALS

CROSS-REFERENCE TO RELATED APPLICATIONS

This application claims priority to U.S. Provisional Application No. 63/166,970 filed on Mar. 26, 2021, PCT International Application Nos. PCT/US22/22201 and PCT/US22/22197 filed Mar. 28, 2022, which are each incorporated by reference.

BACKGROUND OF THE INVENTION

1. Field of the Invention

The present invention relates to the printing of structures by the deposition of cementitious materials. More specifically, the invention relates to an additive manufacturing apparatus that can mix ingredients of cementitious material in various ratios using a batch mixer, and a method of additive manufacturing by cementitious material deposition.

2. Background 3D printing makes it possible to produce a wide variety of physical objects by additive manufacturing methods, that is to say by the repetitive and successive deposition of layers of material.

Initially used for the rapid prototyping of objects, 3D printing is now used to manufacture functional parts and specifically in a variety of fields such as construction where cementitious materials or other suitable materials are deposited in place for the creation of buildings or edifices.

The benefit of 3D printing for the construction of buildings or other structures is the approximate 30% to 60% reduction of construction waste coupled with a shortening of the production lead times by 50% to 70% when compared to conventional construction methods and materials.

Currently, there are several types of technologies for the construction of buildings using 3D printing. Some technologies use gantry systems running on rails where the rails support the printing head of the printer and which bracket the construction zone. These 3D printers are often smaller in size and may be used to create objects made of plastics or metals that are of a relatively small size. The drawback with this type of technology is the relative bulk of the system and the relatively large structure of rails which completely encompasses the building or structure to be created.

One attempt to resolve this problem involves a 3D printer that comprises a robotic arm, allowing the 3D printer to be placed at or near the center of the construction zone, thereby avoiding the installation of a gantry and rail system since the robotic arm can be rotated into the desired position for deposition of various materials. However, the method also has limitations associated with placing the robotic arm and then extracting the robotic arm and support structure after the structure has been completed or substantially completed.

To overcome the above-mentioned limitations caused by the use of a robotic arm or a gantry running on rails, or indeed a combination of the two, in terms of height and of action perimeter, new 3D printing systems have emerged and now make it possible for a print head, used to deposit the material, to be affixed to a crane with a lattice structure type. These systems may be voluminous, heavy and the installation process tends to be complex because it can involve adapting the crane fixing system for each specific printing system and construction location. Furthermore, crane-type printing systems may pose problems of stability and the amount energy used to pump the deposition material to the top of the crane and the printing head for deposition. Cranes also typically require further licensing and training to operate. Additionally, the management of the hoses that are used to deliver the deposition material is often challenging and the prior art devices are limited in this regard.

A further problem faced by prior designs lies in the difficulty of placing printing material in and around obstructions in the print space. At times, the removal of obstructions is untenable while at other times, the obstructions themselves are integral to the final product. For example, prior designs are unable to print cementitious structures with rebar supports due to the bulk of the printhead or the lattice structure which cannot reach the desired print location because of interference from the added rebar. Obstructions may not be limited to rebar either as internal piping, proximity to neighboring structures, and other unexpected obstacles may prevent printing in the desired location.

Accordingly, there remains a need for a printing system that mitigates the defects of the current systems, drawbacks, and obstacles of the prior art. Particularly, a device that makes it possible to control the conditions of printing of the structure to be printed, in particular the position and maneuverability of the printing head, to reduce the labor costs and the time. Without such improvement in the art, 3D printing for buildings and other structures will continue to be suboptimal.

BRIEF SUMMARY OF THE INVENTION

The present disclosure describes apparatus and systems for additive manufacturing using cementitious material. The cementitious material can be a curable material such as concrete. The cementitious material can be prepared by mixing multiple dry and wet ingredients to make a wet, flowable cementitious material. This wet material can be deposited using the apparatus to form a structure such as a building, wall, or other structure. The cementitious material can have an appropriate curing time so that the material hardens over time after the material has been deposited. In some examples, the ingredients that are mixed together to form the cementitious material can include dry cement powder, a dry mineral filler such as sand, a curing accelerator, and water. The apparatuses described herein can individually control the amounts of these ingredients that are mixed together to make the cementitious material. This individual control over the amounts of ingredients can allow properties of the cementitious material to be adjusted at any time during the additive manufacturing process.

In a particular example, an apparatus for additive manufacturing can include a supply of dry cement powder having an individually controllable outlet; a supply of a dry mineral filler having an individually controllable outlet; a supply of a curing accelerator having an individually controllable outlet; and a supply of water having an individually controllable outlet. A batch mixer can receive and mix a controlled amount of dry cement powder from the supply of dry cement powder, a controlled amount of dry mineral filler from the supply of dry mineral filler, a controlled amount of curing accelerator from the supply of curing accelerator, and a controlled amount of water from the supply of water. This can form a batch of cementitious material. A pump can be connected to the batch mixer to pump the cementitious material. A delivery hose can be connected to the pump to deliver the cementitious material pumped by the pump from the mixer. A printhead can be connected to an outlet of the delivery hose. The printhead can be positionable in three-dimensional space.

In another example, a method of additive manufacturing can include selecting individually controlled amounts of dry cement powder, dry mineral filler, curing accelerator, and water to mix in order to form a batch of cementitious material having a desired property. The controlled amounts of dry cement powder, dry mineral filler, curing accelerator, and water can be dispensed to a batch mixer. The dry cement powder, dry mineral filler, curing accelerator, and water can be mixed in the batch mixer to from a batch of cementitious material. A portion of a structure can be three-dimensional printed using the cementitious material. The selecting, dispensing, mixing, and three-dimensional printing can then be repeated. At least one of the controlled amounts can be changed in order to change a property of the cementitious material.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The various embodiments of the present invention may be described in conjunction with the appended drawings wherein like designations denote like elements, and.

DETAILED DESCRIPTION

Figure 1:
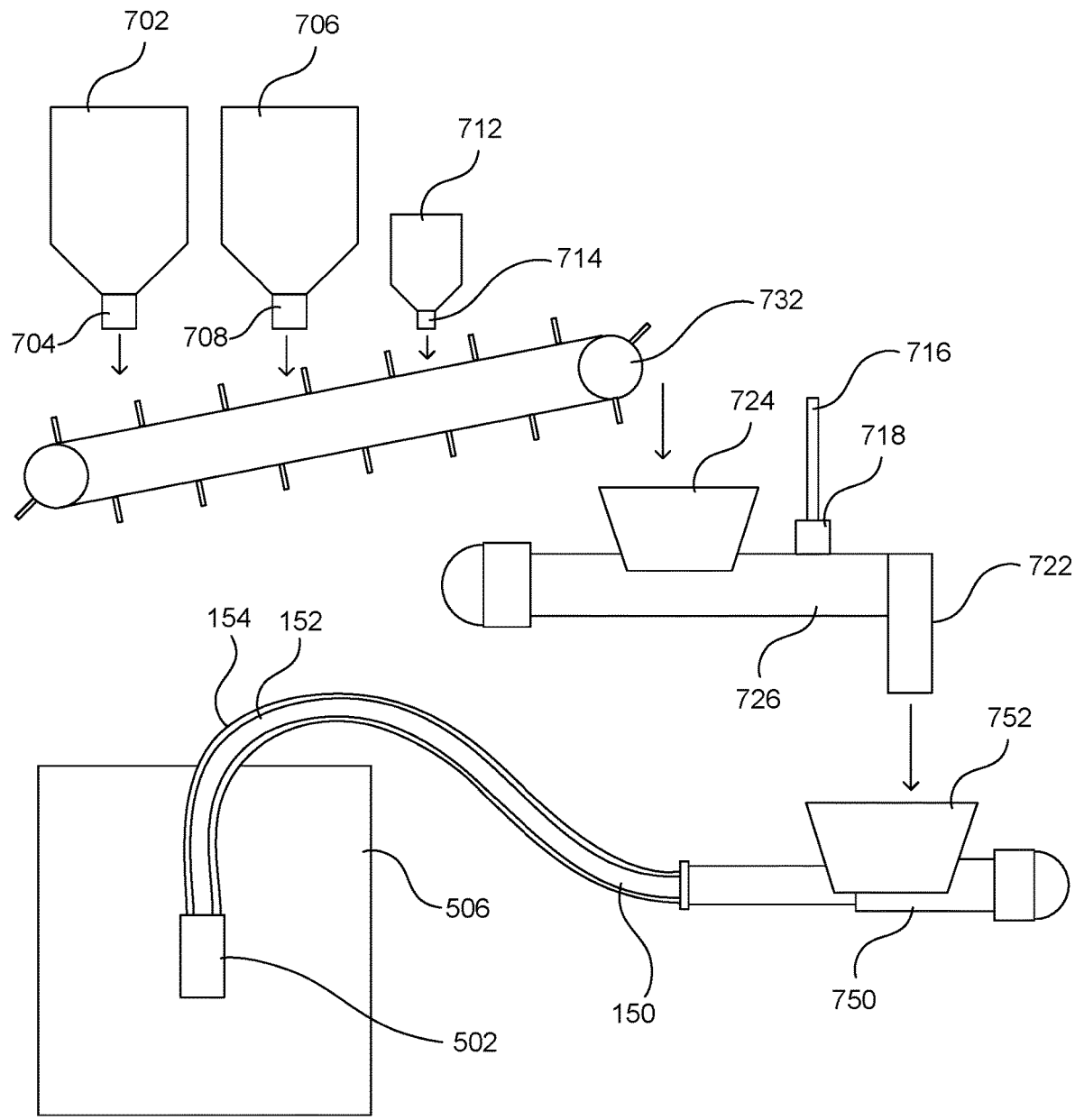
FIG. 1 is a schematic view of an example apparatus for additive manufacturing in accordance with the present disclosure.

The present disclosure describes apparatuses for additive manufacturing using cementitious materials such as concrete as a build material. These apparatuses can be used to print large and durables structures, such as houses, buildings, statues, monuments, walls, stairs, landscaping structures, and others, including portions of these structures. In some examples, a cementitious material can be delivered through a delivery hose to a printhead. The system can control the motion of the printhead in three dimensions to deposit the cementitious material at any location within a print volume. This additive manufacturing process can also be referred to as 3D printing. In some examples, the printhead can include a nozzle that deposits a ribbon of wet cementitious material with a particular width and layer thickness, depending on the size of the nozzle and the rate at which the cementitious material flows through the nozzle. The printhead can be moved in two dimensions (i.e., in the x-y-plane) to any locations where cementitious material is desired to form a single layer of a structure. For example, the cementitious material can be deposited in a shape that forms the outline of walls of a building. The printhead can then be raised (i.e., moved upward in the z-axis direction) and then a second layer of cementitious material can be deposited over the first layer. This can be repeated to deposit many layers of cementitious material to eventually build an entire structure such as a building.

When walls are formed using the apparatuses and methods described herein, in some examples the walls can be self-supporting, meaning that layers of cementitious material in a lower portion of the wall can be sufficiently strong to support the weight of layers above. Therefore, the walls can be printed without the use of forms or molds to support the wet cementitious material. The cementitious material can be a curable material that hardens over a curing time. In certain examples, self-supporting walls can be formed by waiting for a sufficient time after depositing a layer of cementitious material for the material to harden enough to support the weight of the next layer. Therefore, the printing speed can be somewhat tied to the curing speed of the cementitious material. Additionally, it can be useful to deposit additional layers of cementitious material when the layers below have not fully cured, because this can allow the layer below and the layer above to cure together and form a stronger bond between the layers. Thus, selecting an appropriate printing speed can involve balancing the structural strength of the cementitious material, which can increase with time, and the ability of the previous layer of cementitious material to bond with the next layer of cementitious material, which can decrease with time. Furthermore, the cementitious material can have a composition which can be controlled and varied to adjust curing time depending on print speed, environmental conditions, and other factors so as to provide bonding between layers and to avoid slumping of lower layers as additional layers are printed.

The apparatuses and methods described herein can provide a high degree of control over the curing time and other properties of cementitious materials. This can allow for more freedom in selecting an appropriate printing speed. The apparatuses and methods described herein can also be very useful for actively adjusting properties of the cementitious material at any time during 3D printing. In some cases, it may be desired to change a property of the cementitious material in the middle of printing a structure. This could be in response to changing environmental conditions (e.g. temperature, humidity, wind, etc.) that affect the curing time or other properties of the cementitious material. For example, cold temperatures may extend the curing time of a cementitious material. In response to falling temperatures, it may be desirable to speed up the curing of the cementitious material so that the overall curing time remains approximately constant. In other examples, it may be desirable to intentionally change the properties of the cementitious material to form a structure that has differing properties in different portions of the structure. For example, the color of the cementitious material can be changed to make a portion of the structure having a different color.

The apparatuses and methods described herein can allow for fine control over the properties of the cementitious material by providing separate supplies of the individual ingredients of the cementitious material, and providing control over the amounts of each ingredient that are mixed together to form a cementitious material. The supplies of ingredients can include dry ingredients and wet ingredients. Some examples can include a supply of dry cement powder, a supply of dry mineral filler, a supply of curing accelerator, and a supply of water. Each of the supplies can have an individually controllable outlet so that a controlled amount of each ingredient can be dispensed from the supplies. These controlled amounts can them be mixed together to form a wet cementitious material for use in 3D printing. A variety of properties of the cementitious material can be adjusted by changing the ratios of these ingredients that are mixed together.

A schematic view of one example apparatus for additive manufacturing is shown in FIG. 1. This example includes a supply of dry cement powder 702 having an individually controllable outlet 704; a supply of dry mineral filler 706 having an individually controllable outlet 708; a supply of curing accelerator 712 having an individually controllable outlet 714; and a supply of water 716 having an individually controllable outlet 718. In this example, the supplies of dry cement powder, dry mineral filler, and curing accelerator are hoppers. The supply of water is a water hose. A batch mixer 722 can receive a controlled amount of each of these ingredients from the individually controlled outlets and mix the ingredients to form a batch of cementitious material. A pump 750 is connected to the batch mixer so that the pump can receive the cementitious material and pump the cementitious material. In this example, the pump is connected to the batch mixer by having a feed hopper 752 positioned to receive the mixed cementitious material from an outlet of the batch mixer. The pump can include an auger below the feed hopper to pump the cementitious material through a delivery hose 150. The delivery hose outlet is connected to a printhead 502. The printhead is positionable in three-dimensional space by a three-dimensional positioning system 506. In some examples, the three-dimensional positioning system can include a robotic arm, a carriage, a gantry, or other devices that can move the printhead in three-dimensions. In this figure, the three-dimensional positioning system is simply shown schematically as a box.

In the particular example shown in FIG. 1, the dry ingredients are dispensed onto a conveyor belt 732. Any type of conveyor belt for dry materials can be used, but in this example the conveyor belt is an inclined cleated conveyor belt. The conveyor belt carries the dry ingredients from the individual outlets 704, 708, 714 to the batch mixer 722. In this particular example, the batch mixer includes a dry pre-mixer 724 to mix the dry ingredients. The batch mixer also includes a water distribution mixer 726 where water is mixed in after the dry ingredients have been mixed. The individually controllable outlet 718 of the water supply 716 is connected to the water distribution mixer. If other liquid ingredients are to be mixed into the cementitious material then these liquid ingredients can also be added in the water distribution mixer, in some examples.

The delivery hose 150 shown in FIG. 1 is a double-walled hose including an inner hose 152 and an outer hose 154. The inner hose can carry the cementitious material to the printhead 502. The outer hose can be used to flow a thermal regulation fluid to control the temperature of the cementitious material. The thermal regulation fluid can either heat or cool the cementitious material. In some examples, the thermal regulation fluid can include water or air. In certain examples, the thermal regulation can be cool water or air used to cool the cementitious material. Some cementitious materials can have a cure rate that increases with temperature. Some cementitious materials also react exothermally when curing, which can tend to increase the temperature of the materials. Therefore, cooling the cementitious material in the delivery hose can be useful to avoid premature curing within the delivery hose.

In further examples, the apparatus for additive manufacturing can include a control system that can automatically adjust properties of the cementitious material by changing the amounts of individual ingredients that are mixed to make the cementitious material. As mentioned above, properties of the cementitious material can be changed to form portions of a 3D printed structure with different properties than other portions, or the properties of the cementitious material can be adjusted to adapt to changing environmental conditions. The control system can be communicatively coupled to one or more environmental sensors such as a thermometer, humidity sensor, viscosity sensor, wind sensor, pressure sensor, concrete moisture sensor, or others. This can allow the control system to adjust the composition of the cementitious material to respond to changes in environmental conditions, or measured properties of the cementitious material such as viscosity, pressure, moisture content, or others.

The control system can be configured to adjust the curing speed of the cementitious material by changing an amount curing accelerator that is mixed into the cementitious material. In other examples, a curing retarder can also be used and the amount of the curing retarder can be adjusted to provide further control over the curing speed. In certain examples, if the environmental temperature drops then the control system can increase the amount of curing accelerator (and/or reduce the amount of curing retarder) in response to the drop in temperature. If the environmental temperature increases, then the control system can decrease the amount of curing accelerator (and/or increase the amount of curing retarder) in response to the increase in temperature. The moister content of the cementitious material can also be adjusted by changing the amount of water mixed into the cementitious material. In certain examples, the control system can be configured to increase the amount of water if the environmental humidity drops, or to decrease the amount of water if the environmental humidity rises. The control system can also adjust composition based on a length of the hose (i.e. from the mixer to the printhead) since a longer residence time can be expected for longer hoses, thus resulting in differing viscosity upon dispense onto the printed structure. As a general rule, the controller can vary composition based on one, some, or all of the following factors: hose length, temperature, humidity, linear foot of print per pass, and print speed. As a guideline, short prints take less time for each pass such that a faster curing mix can be prepared using additional accelerants. In contrast, longer prints with longer pass times need less accelerant and in some cases benefit from retardant additives to slow down curing times sufficient to allow bonding of the newly printed layer with the immediately previous layer. In this manner, each batch can be adjusted to accommodate desirable changes in composition ratios as conditions vary such as temperature and/or humidity.

Figure 2:
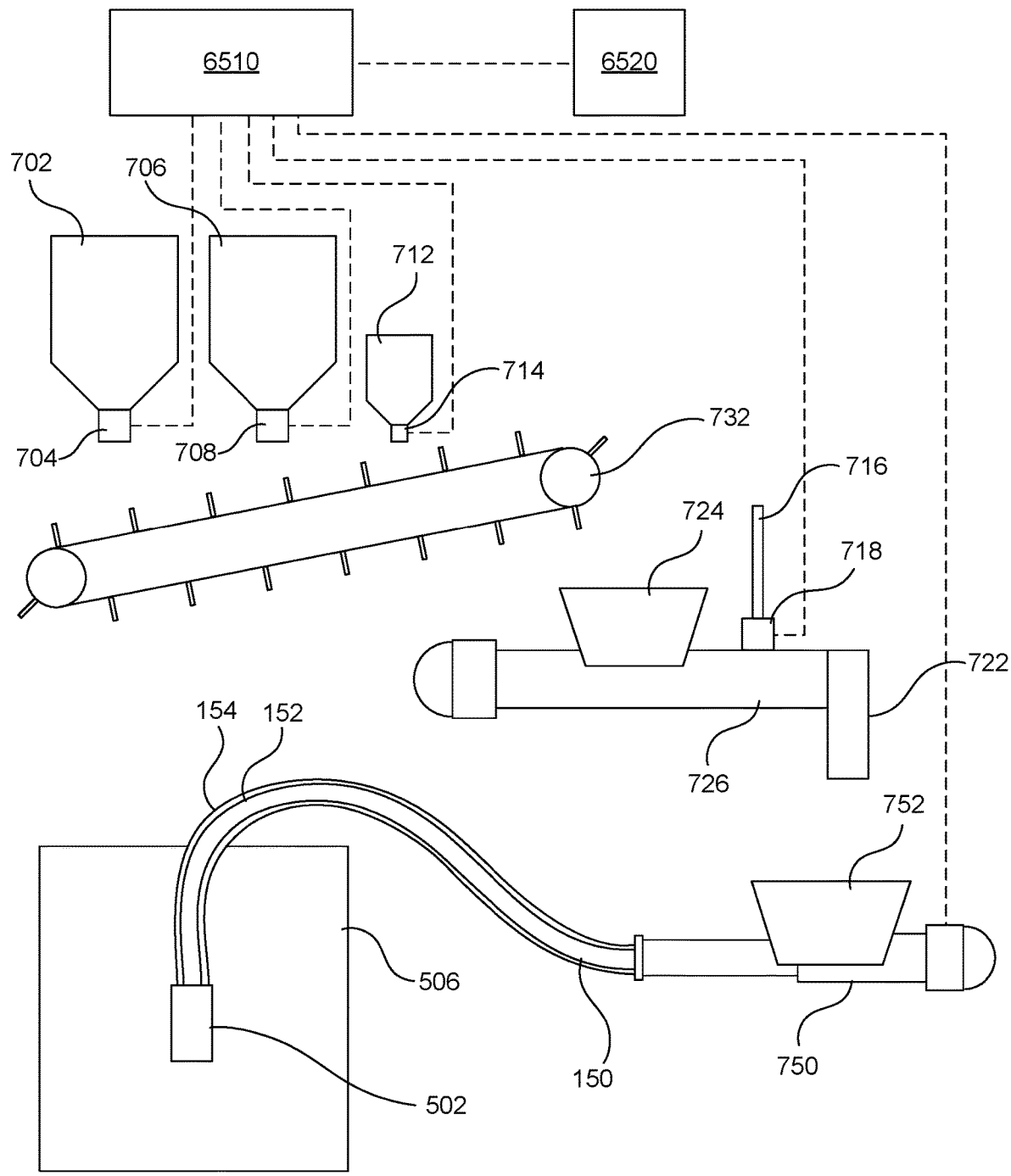
FIG. 2 is a schematic view of another example apparatus for additive manufacturing in accordance with the present disclosure.

FIG. 2 shows another example apparatus that includes a control system 6510. The control system is communicatively connected to an environmental sensor 6520, which can include any type of environmental sensor such as ambient temperature, mud temperature, humidity, viscosity, wind, pressure, concrete moisture content, mix slump (i.e. mix viscosity), or other sensors. Further, sensors can be used to track position and movement of rotary or other valves used to dispense components from the hoppers. As one example, the apparatus can include a set of sensors which include an ambient temperature sensor, a mud temperature sensor, a concrete moisture sensor, an ambient humidity sensor, and a mix slump sensor. A desired composition can be determined by using a reference composition model which can be a reference table, best fit model, or the like in which the measured factors are input to the model to determine a target composition for the next batch.

When the ingredients change in a batch so do the end results of strength and curing time. As a result, each batch composition can be tested (in advance to produce the above reference table) by state approved labs to determine the strength and curing time. Lab testing results are used by structural engineers to determine footing sizes, wall thicknesses etc. Building departments also need to know the lab results for various mixes to verify engineer's calculations. As batch composition change throughout the day the building department can be provided reports that capture the changes in each batch and the outside temperatures with every 5 degree change (i.e. or other temperature increment as desired). Thus, capture of the desired data to adjust the composition of every batch to compositions which are within approved specifications for the target strength and characteristics. Mix reporting can be used to verify that the material used for printing is the same as the material specified on building plans.

As in the example of FIG. 1, this example includes a supply of dry cement powder 702 having an individually controllable outlet 704; a supply of dry mineral filler 706 having an individually controllable outlet 708; a supply of curing accelerator 712 having an individually controllable outlet 714; and a supply of water 716 having an individually controllable outlet 718. The control system is communicatively connected to each of the individually controllable outlets. The connections are shown as dashed lines in this figure. In some examples, the control system can be connected to the outlets and the environmental sensor(s) by wired electronic connections or wireless connections. The individually controllable outlets can include actuators to open and close the outlets to allow the dispensed amount of the ingredients to be controlled.

Although the examples above specifically included supplies of dry cement powder, dry mineral filler, curing accelerator, and water, other ingredients can also be included. In further examples, the apparatus can include supplies of other dry ingredients and wet ingredients, such as curing retardant, plasticizer, polymer, fibers, water repellent additive, colorant, graphene, fly ash, and others. Additionally, some cementitious materials may not include dry cement powder, dry mineral filler, or curing accelerator. Therefore, in some examples, the apparatus may not include supplies of one or more of these ingredients. In certain examples, each individual ingredient supply can include its own individually controllable outlet. The apparatus can also include multiple supplies of different specific examples of a type of ingredient, such as different types of mineral filler. Examples of mineral fillers can include sand, clay, gravel, crushed stone, quartz, glass, limestone, and others. Some ingredients can also be in either dry or wet form. Curing accelerators, curing retardants, polymers, plasticizers, water repellent additives, colorants, and other ingredients may be available in dry or wet forms. In one example, the system can include a set of at least seven hoppers and up to ten hoppers which are each individually metered and include seven to ten of sand, lime, cement, accelerant, retardant, plasticizer, polymer, graphene, fly ash, and colorant.

In further examples, the control system can automatically control the other components in the apparatus to mix and pump additional batches of cementitious material after a first batch has been used. In certain examples, the mixing of a new batch of cementitious material can be triggered by detecting a low weight of wet cementitious material in the feed hopper of the wet pump. For example, the feed hopper can include a scale that weighs the cementitious material. When the scale detects a weight of cementitious material below a certain threshold, the control system can automatically begin making a new batch of cementitious material. In other examples, a scale can be included in or on the conveyor belt to weigh the dry ingredients dispensed onto the conveyor belt. This can be used to measure and control the amounts of individual ingredients that are dispensed onto the conveyor belt in some examples.

The batches of cementitious material that are mixed by the batch mixer can be relatively small, meaning that multiple batches can be used during 3D printing of a structure. In some examples, the batches of cementitious material can be from about 1 cubic foot to about 20 cubic feet in volume. In other examples, the batches can be from about 1 to about 10 cubic feet, or from about 1 to about 5 cubic feet, or from about 5 to about 10 cubic feet, or from about 10 to about 20 cubic feet in volume. Of particular interest are batches of no more than about 4.5 cubic feet, e.g. from about 2 to about 5 cubic feet. Therefore, many batches of cementitious material can be used when printing a large structure such as a house. Additional batches can be mixed frequently, with a time between batches being from about 1 minute to about 1 hour, or from about 1 minute to about 30 minutes, or from about 1 minute to about 15 minutes, or from about 5 minutes to about 1 hour, or from about 5 minutes to about 30 minutes, or about 5 minutes to about 15 minutes in some examples. Mixing additional batches frequently can allow the properties of the cementitious material to be adjusted frequently.

Figure 3:
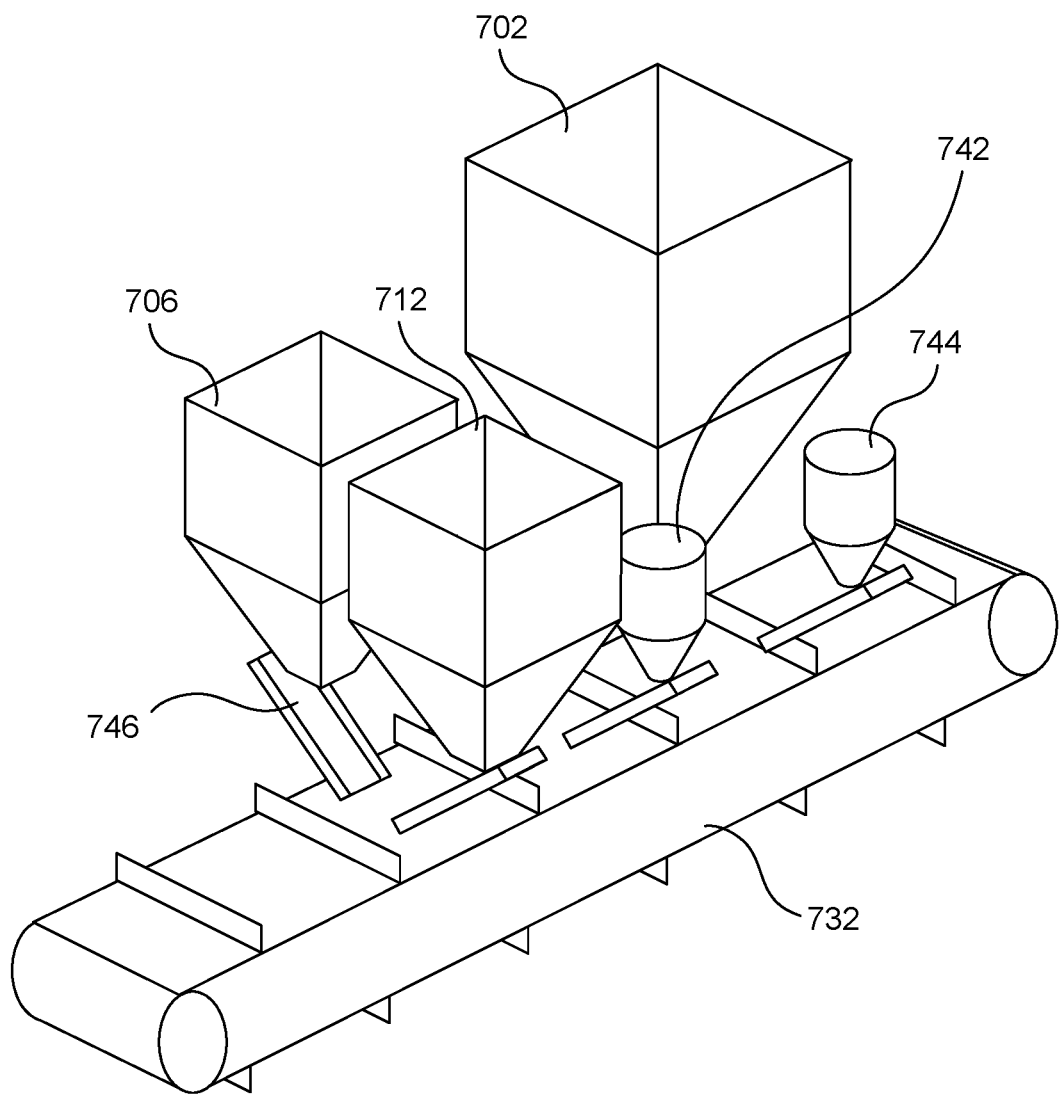
FIG. 3 is a perspective view of an example batch mixing system including ingredient supplies and batch mixer for use in an apparatus for additive manufacturing in accordance with the present disclosure.

FIG. 3 shows a perspective view of another example of the supplies of dry ingredients. This example includes a supply of dry cement powder 702, a supply of dry mineral filler 706, and a supply of curing accelerator 712. The supplies can include hoppers of different sizes depending on the quantity of the ingredients that are typically used when mixing the cementitious material. This example also includes two additional ingredient supplies 742 and 744. Any number of additional ingredient supplies can be added depending on the number of ingredients that are to be used to make the cementitious material. The supplies of ingredients have individually controllable outlets at the bottom end of the hoppers. This example also includes chutes 746 to direct the dry ingredients onto the conveyor belt 732. As in the previous examples, the conveyor belt can carry the dry ingredients to a batch mixer to be mixed with water and any other desired wet ingredients to form a wet cementitious material.

Figure 4:
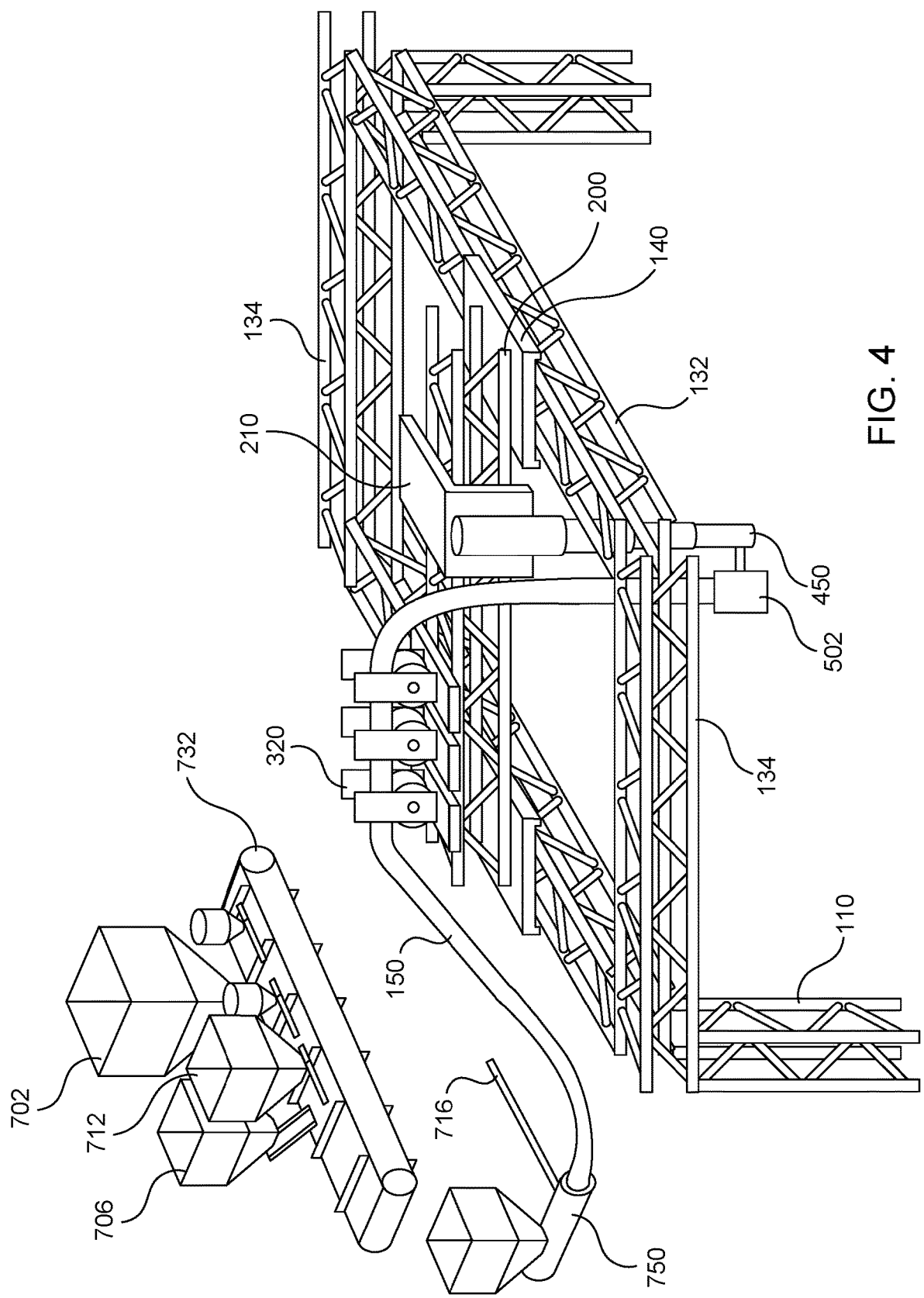
FIG. 4 is a perspective view of another example apparatus for additive manufacturing in accordance with the present disclosure.

FIG. 4 shows a perspective view of another example apparatus for additive manufacturing. Cementitious material can be mixed using a system similar to the examples described above. A supply of dry cement powder 702, a supply of dry mineral filler 706, and a supply of curing accelerator 712 can have individually controllable outlets that dispense these ingredients onto a conveyor belt 732. The outlets can be opened and closed selectively using any suitable valves (e.g. rotary valves, metered butterfly valves, auger meter valves, or the like). The dry ingredients are carried by the conveyor belt to a batch mixer 750. In this example, the batch mixer is combined with a pump as a single unit that mixes the dry ingredients, adds water from a water supply hose 716, and pumps the wet mixed cementitious material through a delivery hose 150. The delivery hose has an outlet connected to a printhead 502. This example shows one example of a three-dimensional positioning system that can be used to control the position of the printhead in three-dimensional space. This system includes x-axis members 134 and y-axis members 132 that are supported on legs 110. This example can include four legs, with one at each corner of the structure, although two of legs are omitted from the figure for the sake of clarity. An x-axis gantry 200 can be supported by two y-axis carriages 140, which can slide along the y-axis members using wheels, bearings, or another such moveable structure. An x-axis carriage 210 can slide along the x-axis gantry using similar wheels, bearings, or other such structures. A telescoping z-axis member 450 is coupled to the x-axis carriage. Thus, the z-axis member can move in the x-axis direction by sliding on the x-axis carriage, and also in the y-axis direction as the x-axis gantry slides on the y-axis carriages. The z-axis member can telescope to extend the bottom of the z-axis member down or to retract the z-axis member upward.

The printhead can be coupled to the bottom end of the z-axis member so that the printhead moves up and down with the bottom end of the z-axis member. Thus, the printhead can move in all three directions: x-axis, y-axis, and z-axis. This system also includes trolley units 320 that slide along the x-axis gantry. These trolley units include hose support wheels to support the delivery hose above the x-axis gantry. The delivery hose can roll freely over the hose support wheels. This can reduce friction on the hose when the hose is pulled in various directions by the motion of the printhead.

As mentioned above, the apparatuses described herein can be used to form structures of cementitious material through an additive manufacturing, or 3D printing, process. In some examples, the apparatuses and methods described herein can allow large structures, such as houses, to be built in a short time. As an example, a single family home with a square footage of 1,000 sq. ft. to 3,000 sq. ft. can be built in as little as a day to a few days using the apparatuses and processes described herein. In particular, walls of a house or other structure can be formed of cementitious material using the methods described herein. Some parts of the structure can often be made using other materials and methods. For example, plumbing, wiring, roofing, and a variety of other parts of a structure can be constructed using other materials and techniques. However, walls can be easily formed with very little labor using an apparatus as described herein.

The build time for a structure made using the apparatuses and methods describe herein can depend on the speed capabilities of the 3D printing system used and the properties of the cementitious material. As discussed above, increasing curing speed of the cementitious material can be useful so that a layer of cementitious material cures quickly and becomes strong enough to support a subsequent layer of material deposited on top thereof. However, it can also be useful to deposit the subsequent layer before the first layer is fully cured so that the two layers can bond together well. Therefore, the appropriate curing speed can balance the strength of the material with bonding ability. If too much weight is deposited over a layer of cementitious material before the material is sufficiently strong, then the layer of cementitious can slump, or squeeze downward instead of supporting the above layers at the intended height. This can cause the structure to be deformed or even cause the structure to fail and fall down. Therefore, the cementitious material can be formulated so that it will have sufficient strength to support the layers of cementitious material that are deposited over the top of each layer. In some examples, a layer of cementitious material can have a curing speed that makes the layer sufficiently strong to support at least one subsequent within 5 minutes of being printed. In further examples, a layer of cementitious material can have a curing speed that makes the layer sufficiently strong to support at least 10 additional layers of cementitious material within 30 minutes of being printed (under the assumption that the layers are all include the same weight of cementitious material).

The cementitious material can be deposited in horizontal layers. A first layer can be deposited on a build surface, and then multiple additional layers can be deposited over the top of the first layer. In some examples, the horizontal layers can be deposited at a rate from about 1 layer per hour to about 10 layers per minute, or from about 5 layers per hour to about 5 layers per minute, or from about 10 layers per hour to about 1 layer per minute, or from about 10 layers per hour to about 30 layers per hour, or from about 10 layers per hour to about 20 layers per hour, or from about 30 layers per hour to about 10 layers per minute, or from about 30 layers per hour to about 5 layers per minute, or from about 30 layers per hour to about 1 layer per minute. The layers can be printed at a layer height that can be adjusted by moving the printhead up or down in the z-axis direction. In some examples, the layer height can be from about 0.25 inch to about 5 inches, or from about 0.5 inch to about 5 inches, or from about 1 inch to about 5 inches, or from about 2 inches to about 5 inches, or from about 3 inches to about 5 inches, or from about 0.5 inch to about 3 inches, or from about 1 inch to about 3 inches.

The cementitious material can be formulated to partially cure relatively quickly to a sufficient strength to support the weight of subsequent layers of cementitious material deposited over the top thereof. However, the cementitious material can also take a relatively longer time to fully cure to full strength and hardness. For example, the cementitious material can be partially cured after a minute or a few minutes and have sufficient strength to support the overlying layers of cementitious material. However, the cementitious material may not reach full hardness for multiple days or weeks. In some cases, it can be useful to form a structure from layers of cementitious material by 3D printing as described above, and then make modifications to the structure before the cementitious material has fully cured. Modifications can include cutting out openings for doors, windows, electrical outlets, pipes, and so on. Cutting out these openings while the cementitious material is partially cured can be much easier than after the material is fully cured. For example, concrete can be extremely hard and difficult to cut when fully cured. However, concrete can have sufficient strength to form a free-standing 3D printed wall after a matter of minutes of hours without being fully cured. At this point, the partially cured concrete can be cut much more easily using power tools, hand tools, or even by using dies or "cookie-cutter" shapes that can be pressed into the concrete while it is sufficiently soft. In a specific example, an electrical outlet box cutout can be made by pressing a metal form having the dimensions of the outlet box into the partially cured cementitious material. This can cut out a rectangular piece of the partially cured cementitious material, and this piece can easily be removed to leave an opening of the correct size for an electrical outlet box. Similarly, a circle can be cut having the appropriate size for a circular pipe. Any other desired size and shape of opening can be cut for ventilation ducts, wiring, and other openings. In some examples, an opening can be cut having the same dimensions as a window, and the window or window frame can then be inserted into the opening. Similarly, an opening for a door or frame can be cute and then the door or door frame can be inserted into the opening. All this can be done while the cementitious material is partially set. In some examples, these openings can be cut while 3D printing is still in progress, depositing layers above the height of the openings being cut.

In further examples, a variety of objects can be inserted into the cementitious material while the material is sufficiently soft. As mentioned above, electrical outlet boxes, windows, doors, pipes, and other such objects can be inserted into openings cut in the cementitious material. In some cases, inserts can be added without cutting an opening first. For example, rebar can be inserted into the wet cementitious material to reinforce the material. Other inserts can include metal rods, metal mesh, pipes, wires, and others.

Walls of structures such as houses or other buildings can be formed as a single wall, made up of a single stack of layers of cementitious material, or a double wall, made up of two stacks of layers of cementitious material. In certain examples, a double wall can be formed with an inner wall and an outer wall separated by a certain distance, such as from about 4 inches to about 16 inches or more. The space between the inner wall and outer wall can be used to contain insulation, wiring, plumbing, and other elements. In some cases additional structural elements can be formed in the space by 3D printing cementitious material. For example, a wall may include an inner wall and an outer wall with a zigzag or corrugate shaped wall in between the inner and outer wall, all formed by 3D printing cementitious material.

Figure 5:
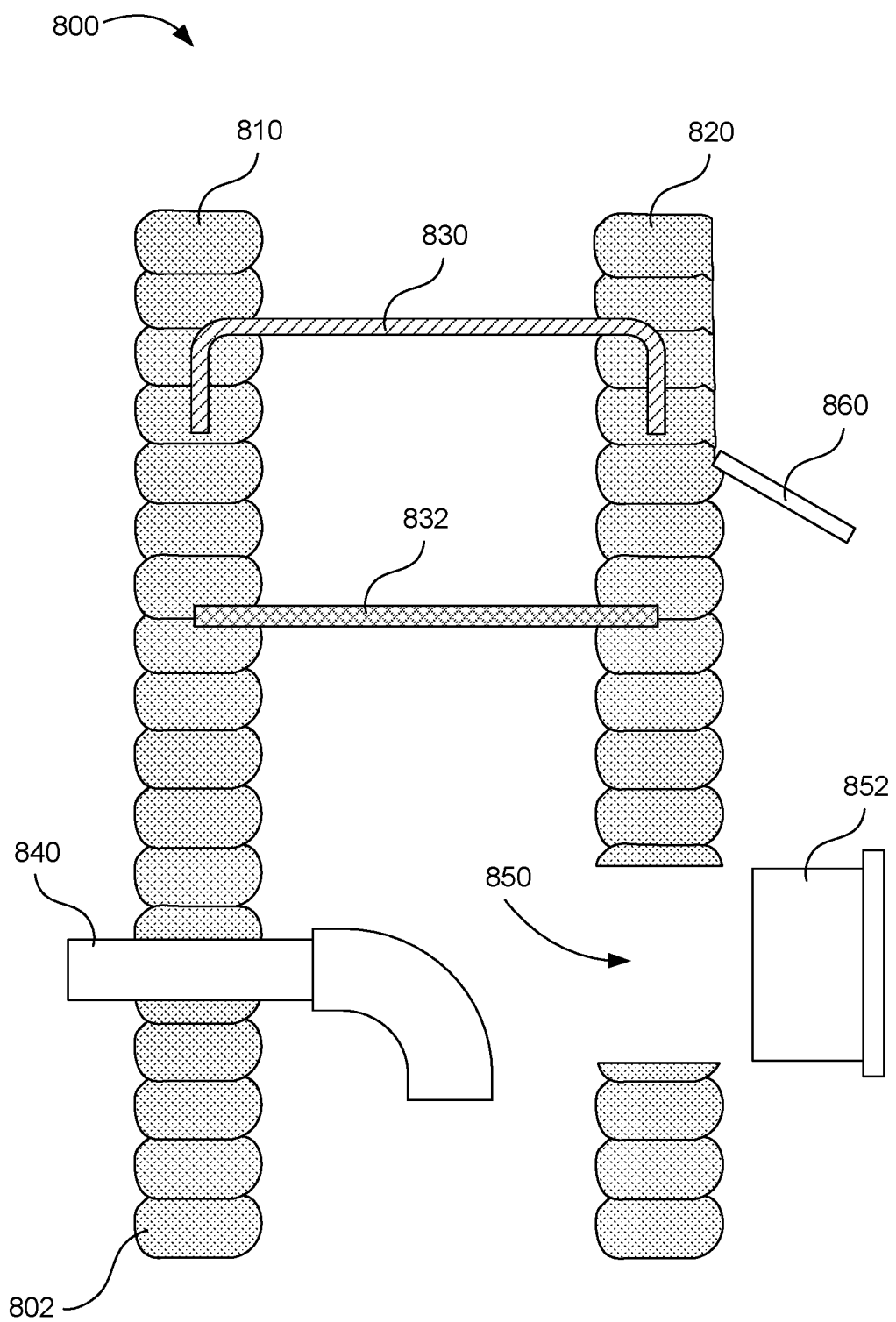
FIG. 5 is a cross-sectional view of an example wall formed using an apparatus for additive manufacturing in accordance with the present disclosure.

FIG. 5 is a cross-sectional view of a wall 800 formed using an apparatus and method as described herein. The wall includes an inner wall 810 and an outer wall 820 spaced apart one from another. The inner wall and outer wall are made up of stacked layers 802 of cementitious material, which have been deposited from a printhead as described above. This figure also shows several ways of modifying the wall after printing. These can be done after the cementitious material has been deposited, but before the cementitious material is fully cured. First, a tie rod 830 is placed in the inner wall and outer wall to tie the inner wall and outer wall together. This tie rod can be pressed down into one of the layers of cementitious material while 3D printing is in progress. Additional layers of cementitious material can then be deposited over the top of the tie rod. The tie rod can provide temporary structural support to keep the spacing distance between the inner wall and the outer wall to ensure that the walls do not slant toward one another or away from one another while the cementitious material is wet. The strength provided by the tie rod may be negligible compared to the strength of the cementitious material once fully cured, but the tie rod can be useful for temporary support during printing. The figure also shows a tie mesh 832 that can perform the same function as the tie rod. The tie mesh can be a piece of mesh, such as metal mesh, that is laid over one of the layers of cementitious material and which spans the gap between the inner wall and the outer wall. This figure also shows a pipe segment 840 that has been placed in the inner wall. Pipes can be placed to penetrate through the wall by cutting a circular hole and then placing the pipe in the hole, in some examples. In some cases, it can be useful to place pipes like this while 3D printing is in progress before the wall reaches a height of more than a foot or so above where the pipe is to be placed, so that the location of the pipe can be easily reached from above. The outer wall includes an electrical box opening 850 that has been cut in the cementitious material. The figure also shows an electrical box cutting template 852 that can be used to cut the opening. The electrical box cutting template can be a die or "cookie-cutter" shaped tool that has thin metal edges in the same shape as the electrical box opening. This tool can be pressed into the cementitious material by hand or using a mallet or other tool. The template can then be removed with a rectangular piece of the wall, leaving a rectangular opening in the wall. In other examples, any other shape of opening can be formed in the wall using a similar process. The wall can also be provided with a surface finish while the cementitious material is still wet. This figure shows a trowel 860 smoothing a portion of the outer wall. If a smooth surface is desired, then the entire surface of the outer wall can be smoothed in this way while the cementitious material is wet. In other examples, the surface can be textured with any desired texture, or the surface can be left undisturbed with a 3D printed appearance.

The components of apparatuses for additive manufacturing described above can be combined in any desired combination in various embodiments. Additional components and features of apparatuses for additive manufacturing are described below. In some examples, the additive manufacturing system comprises: a support structure; an y-axis member mounted to the support structure; an x-axis member mounted to the support structure; a z-axis member mounted to the support structure; a hose management apparatus mounted to the support structure; a supply tank containing a supply of a material to be deposited; a delivery hose connected to the hose management apparatus and to the supply tank; a printhead, that may be rotatable or repositionable, connected to the delivery hose where the printhead being configured to deposit the supply of material to be deposited; and a control system for controlling the movement and location of the printhead in three dimensional space. An additive manufacturing system is disclosed wherein the additive manufacturing system comprises: a support structure; a y-axis member mounted to the support structure; a x-axis member mounted to the support structure; a z-axis member mounted to the support structure; a hose management apparatus mounted to the support structure; a supply tank containing a supply of a material to be deposited; a delivery hose connected to the hose management apparatus and to the supply tank; a repositionable and rotatable printhead connected to the delivery hose with the printhead being configured to deposit the supply of material to be deposited; and a control system for controlling the movement and location of the printhead in three-dimensional space.

The printhead may be a hose coupled to a nozzle, which may be referred to as an outlet, that may be configured to extrude cementitious material. The printhead may be mounted on an extendable or telescoping z-axis member. When the z-axis member may be extended in the vertical direction, then the printhead, which may be coupled to the outer surface of the z-axis member, may also be extended in the vertical direction.

For purposes of this disclosure, a motor includes the connectors or couplers useful for coupling a motor to one or more pulleys.

A z-axis member may be a z-axis beam that extends along the z-axis towards the ceiling and towards ground. A z-axis member may include one or more rails or one more tracks upon which one or more carriages may be slid upon. An x-axis member may include one or more rails or one more tracks upon which one or more carriages may be slid upon. An x-axis member may be an x-axis beam that extends along the x-axis which may be horizontal. A y-axis member may be a y-axis beam that extends orthogonally with respect to the x-axis while simultaneously extending orthogonally with respect to the z-axis. A y-axis member may include one or more rails or one more tracks upon which one or more carriages may be slid upon.

A z-axis assembly may include a z-axis member that may be coupled or communicatively coupled to one or more of one or more motors, one or more gears, one or more couplers, one or more pulleys, one or more gear trains, one or more timing bands, and one or more power sources, and one or more rails upon.

An x-axis assembly may include an x-axis member that may be coupled or communicatively coupled to one or more of one or more motors, one or more gears, one or more couplers, one or more pulleys, one or more gear trains, one or more timing bands, and one or more power sources. An x-axis gantry assembly may be an x-axis assembly that may be disposed between a first x-axis assembly and a second x-axis assembly, such that the x-axis gantry assembly may have a first end and a second end wherein the first end may be moveably coupled to a first y-axis assembly and the second end may be moveably coupled to a second y-axis assembly, such that the x-axis gantry assembly may slideably move along the first y-axis assembly and the second y-axis assembly while moving closer to the first x-axis assembly and simultaneously moving further from the second-x axis assembly or while moving further from the first x-axis assembly and simultaneously moving towards from the second-x axis assembly.

A y-axis assembly may include a y-axis member that may be coupled or communicatively coupled to one or more of one or more motors, one or more gears, one or more couplers, one or more pulleys, one or more gear trains, one or more timing bands, and one or more power sources.

The z-axis member may also be moved vertically away, by a z-axis assembly, from a printing surface; when the z-axis member has telescoping units and is configured to telescope such that the telescoping units of a z-axis member may be retracted such that the length of the z-axis member may be decreased; the inner surface of each telescoping unit may have one or more ridges.

In some embodiments, the z-axis assembly may be coupled to an x-axis gantry assembly such that the z-axis assembly may include one or more rails or one or more tracks upon which the other component of the z-axis assembly may slideably move in the vertical direction; the z-axis beam, z-axis assembly, or the z-axis assembly other than the one or more rails or one or more tracks upon which the z-axis assembly may slideably move may be configured to move vertically up-and-down to print both more closely to the rebar and to allow the x-axis gantry, which may be disposed upon tracks at the top of the printer structure's exoskeleton, to clear tall objects.

In further embodiments of the present invention, they-beam gantry may have a fixed height, and in some embodiments, they-beam gantry may be configured to stay at a fixed vertical position so that they-beam gantry, in some embodiments, may not be moved vertically upward as the layers being printed increase in vertical position.

In still further embodiments of the present invention, the z-axis member may be positioned on rails to move vertically in conjunction with a z-axis carriage which also may ride a separate set of horizontal rails on the x-axis beam. The gantry may move perpendicularly along a set of rails on the exoskeletal structure of the additive manufacturing system. In other examples, the gantry can move on the exoskeletal structure without the use of such rails.

An additive manufacturing system is disclosed, the additive manufacturing system may also be called a 3D printer or large scale 3D printer. The additive manufacturing system may receive various materials and may be a 3D Printer capable of printing with many types of materials using software and supporting components that work in unison including a pre-mixer, water distribution mixer, pumping system, hose, and may use a stationary or 360 degree rotating head for large and small scale construction with a myriad of different mix formulas, from concrete, foamcrete, hempcrete, geopolymer, epoxy, and resin and other cementitious material.

Some examples of the additive manufacturing system may have a substantially narrow z-axis member. The z-axis member may be configured to deliver via the hose, composition material such as concrete; the z-axis member may be narrow enough to print around vertical rebar, tied-off rebar, and plumbing or other elements, and which may use a modular system for supplying concrete, additives to alter the qualities of the concrete, or other materials to the printhead.

The z-axis member may be less than 20 feet in diameter and may be relatively narrow, such as a foot or less in diameter, or no more than 6 inches in any horizontal dimensions, so that the printhead may print material next to structures such as rebar or plumbing. The z-axis member may be less than 100 feet in length or may be greater than 60 feet in length. Due to the positioning of the gantry, which may also be referred to as an x-axis member, which may be coupled to the z-axis member, the gantry may clear these obstructions in the foundation or other formed elements that may extend vertically. The printhead may be a hose coupled to a nozzle, which may be referred to as an outlet, that may be configured to extrude or "print" cementitious material. The printhead may be mounted on an extendable or telescoping z-axis member.

When the z-axis member is extended in the vertical direction, then the printhead, which may be coupled to the outer surface of the z-axis member, may also be extended in the vertical direction. The z-axis member may also be moved vertically away from a printing surface; when the z-axis member may be configured to telescope, then the telescoping units of the z-axis member may be un-extended such that the length of the z-axis member may be decreased. Any reference to a member may also be substituted with an assembly such that some references to a z-axis member may refer to a z-axis assembly, some references to an x-axis member may refer to an x-axis assembly, and some references to a y-axis member may refer to a y-axis assembly.

The gantry (which may be termed the x-axis gantry and may be referred to as an x-axis member or x-axis beam), the z-axis assembly, or the z-axis beam, may be located on a series of tracks that may be located to move vertically up-and-down to print both more closely to the rebar and to allow the gantry, which is on tracks at the top of the printer structure's exoskeleton, to clear tall objects. In some embodiments, the y-beams may have a fixed height, and in some embodiments, the y-beams may be configured to stay at a fixed vertical position so that the y-beam, in some embodiments of the present invention, may not be moved vertically upward as the layers being printed increase in vertical position.

The z-axis member may have rails to move vertically along a z-axis carriage which also may ride a separate set of horizontal rails on the gantry. The gantry may move perpendicularly along a set of rails, such as a third set of rails, on the exoskeletal structure of the printer.

In order to accomplish this movement of the z-axis member while printing, a hose management apparatus may be used to facilitate substantially smooth movement of the hose. The additive manufacturing system may use a hose of fixed length which may be directly coupled to the printhead nozzle. The hose length is also an important variable when considering adjustment of the cementitious material composition since a longer hose will result in longer residence time within the hose (i.e. from mixer to printhead) which also results in changes in the viscosity of the dispensed material. A hose management apparatus may include a hose detachably coupled to a trolley system; in order to move in-and-out of the printing space on the z-axis, and in some embodiments, the hose may sit above the x-axis gantry or on the x-axis gantry so as to avoid colliding with objects in the printing space. The printing space refers to a 3D space upon which cementitious material may be layered and through which the print head may be transported.

The hose management apparatus may be used to prevent the hose from bumping into the rebar, plumbing, or other obstacles, and to not hit the printed structure itself. The hose may be connected to the lower end of the z-axis member, and then may extend across an expandable and contractible trolley system on the top surface of the gantry. This trolley system may have a plurality of wheeled units, which may be referred to as trolley units, on the rail system mounted on the gantry.

The trolley units, which may be wheeled units, may have a bearing block on the bottom of each trolley unit to ride the rail, a hose support wheel with guide fins may be disposed on either side of the top of the trolley unit; the hose may travel along the upper surface of the trolley units. A set of spacers, which may be made of any material, may be positioned to front or the back of a trolley unit to prevent the hose support wheels from contacting each other and locking up. The trolley units may be attached to each other in sequence by cables with one end attached to the z-axis carriage and the other end may be attached to the end of the x-axis gantry where the hose may be frictionally coupled to the frame of the printer.

A hose feeder system, which may be a subsystem of the hose management apparatus may be located at within 100 meters of the location where the hose is frictionally coupled to the frame of the printer; the subsystem of the hose management apparatus may be configured to further reduce the shaking of the printer and to further reduce strain on the x-axis gantry motor as the hose coils and uncoils on the ground. The hose feeder system may lift and lower (or push and pull) a hose off the ground. The hose feeder system may include a number of pulleys or a number of motors; and the pulleys or motors, which may be coupled to a plurality of gears, may actuate the movement of the hose feeder or motor-driven hose simultaneously with the movement of an x-axis gantry motor; the movement of the motor of pulleys may be at a steady rate towards or away from the printer to reduce shaking, vibration, and whipping of the hose.

The hose management apparatus may be useful for a substantially lightweight additive manufacturing system. The support structure of the additive manufacturing system may be aluminum trussing beams or other lightweight materials. In some cases, lightweight materials are used for the support structure, which may facilitate easier transportation and set-up/teardown, and also may reduce damage. Trussing beams may allow wind to pass through the structure without shaking or moving the printer structure, which may impact the printhead's path. The use of lightweight trussing beams is counterintuitive, as vibration in the 3D printer increases, additional features to mitigate this vibration may be called for. 3D printers in the prior art often include heavy footings to increase stability, but the present apparatus foregoes those in favor of portability of the 3D printer apparatus.

Additionally, aluminum trussing, which has rounded poles in each corner of a single beam, may allow for the gantry to forgo rails and instead utilize a wheeled carriage that has wheels which interact at a 30 to 60 degree angle, or about a 45-degree angle with those rounded corner poles of a single aluminum truss beam on each of the top two corners. The connection pins for the trussing, when coupled with the trussing, may extrude a substantially small distance from the trussing; the connections of the trussing may be machined trussing that may allow smooth movement of the gantry's carriage across the full-length of the exoskeletal structure. Trussing made of other lightweight materials is also usable, particularly carbon-fiber trussing, fiberglass, or anything lightweight and rust-resistant.

Additional environmental control enclosures, telescoping z-axis support, elevators, and the like can also be used as described in co-pending PCT International Application Nos. PCT/US22/22197 and PCT/US22/22201, filed Mar. 28, 2022, which are each incorporated herein by reference. The environmental control enclosures can provide a tent enclosure to reduce temperature and humidity variations throughout the day. These enclosures can optionally further include one or more of heaters, AC units, evaporative coolers, humidifiers, misters, and the like. In some cases, an ambient temperature within the enclosure can be maintained at from 65 to 70° F. As a result, when using ambient temperature sensors, the batch mixture can be maintained at a relatively higher temperature than outside temperatures (during cold weather) such that faster curing time is achieved while also reducing use of expensive additives.

The material mixing method may include the use of a formula pre-mixer, vertical elevator, water distribution mixer, second vertical elevator, and wet pump, which may be the pump which is coupled to the hose with quick disconnects. The water additive hopper is capable of adding water in precise amounts or manually by a worker, and the pump is any suitable pump, such as a rotor-stator or squeeze pump. This method of separate machines may allow for modularity and quick swapping of components, though a single device coupling all these elements together is also part of our intended device patent, wherein the parts are still swappable.

A z-axis member may be a z-axis member; the z-axis member may be comprised of telescoping sections; alternatively, the z-axis member may be of a fixed length, and a motor system may be used to raise or lower vertically the z-axis member. In some embodiments, the z-axis member may be coupled to a y-axis member or an x-axis member; the y-axis member of the x-axis member may be coupled to a motor and a set of gears and timing belts.

In at least some embodiments of the present invention, the system may include one or more y-axis rails, each of which may include one or more linear bearing rails coupled to one or more bearing boxes. Additionally, in some alternative embodiments of the present invention, the system may include one or more x-axis rails. In some embodiments, the system may include y-axis rails and x-axis rails. In some embodiments, the system may include a rail-less track system. The y-axis member may include a rail-less track, or the x-axis member may include a rail-less track.

An angled view of a single hose management trolley unit is depicted. For purposes of this disclosure, the references to a y-axis and an x-axis may be switched such that the x-axis may refer to the y-axis and what is originally referred to as the y-axis may refer to the y-axis.

A wheeled unit in the hose management system may also be called a trolley unit, and an x-axis member may be referred to as an x-axis gantry For purposes of this disclosure, a "printhead assembly" may include at least one printhead, nozzle and one or more of at least one coupler, at least one valve, and at least one motor. Some embodiments of an exoskeleton may include one or more legs, which may be a support structure for the exoskeleton, which may be located at the perimeter of the exoskeleton, and which may include truss structures for support. A hose management system may sit on top of the exoskeleton, such as on the x-axis gantry. The hose management system may be configured to organize the position of hoses during operation of the printer so as to avoid or decrease the entanglement of hoses. Cementitious material or printable material may be delivered through one or more hose; additionally, a nozzle may be coupled to an end of the hose to provide an outlet or controllable outlet through which cementitious material or printable material may be delivered. A controller may control processing hardware and circuitry for automatically managing the printer. Some embodiments of the controller may be configured to use machine learning algorithms to speed up the printing process and to control the mixing of cementitious materials by the batching system. In some embodiments, a plurality of hoses are used to deliver cementitious material.

Torque may be created by some configurations of a pulley system assembly that includes one or more bands or timing bands; at least one end of the x-axis gantry may have torque and may allow a band to travel through a pulley that is connected to the timing belt and so the bands are just connecting the motor's axle line to the timing belt that runs the length; a timing belt may be connected to the pulley; a pulley motor assembly may include a pulley operably coupled to a motor; the pulley motor assembly may be detachably coupled to a timing belt; when the motor of the pulley motor assembly rotates, the motor may then cause an assembly of one or more gears to rotate such that the timing belt of a vertical beam, which may be coupled to the one or more gears, is moved to a new timing belt vertical position; and a stepper motor may be used to track the movement of a band or timing belt, which may be based on the number of full 360-degree rotations or the number of partial rotations tracked by a stepper motor or determined by the sensing of a proximity sensor target of a proximity sensor; the stepper motor may calculate how many times a gear with teeth has been rotated; thereby measuring directly or indirectly the distance that a portion of a timing belt or a portion of a band has traveled. In some embodiments, a proximity sensor target is located on a timing belt, and when the proximity sensor target passes within sensing range of a proximity sensor, then the detection of the proximity sensor allows the automatic controller to determine the location of the timing belt, which may be useful to calculating the location of component of the system, such as the x coordinate, y coordinate, or z coordinate location of the z-axis member or the location of the z-axis member with respect to the vertical plate or to a location on the x-axis gantry.

In some embodiments, each beam may be associated with one or more timing belts, such as four timing belts. The timing belts may run the length of the beam; and a motor may be associated with each of the timing belts; and on the horizontal beam a horizontal carriage may move along the horizontal position; in some embodiments, the z-beam is sufficiently narrow so that it may be positioned in between two or more rebars; in some embodiments the z-beam is four inches by four inches; the trussing may be 12-inches in length or width. The gantry may be bowed by the addition of spacers, washers, or other flanges on the ends such that the middle portion of the gantry is at a higher position than the ends.

Figure 6:
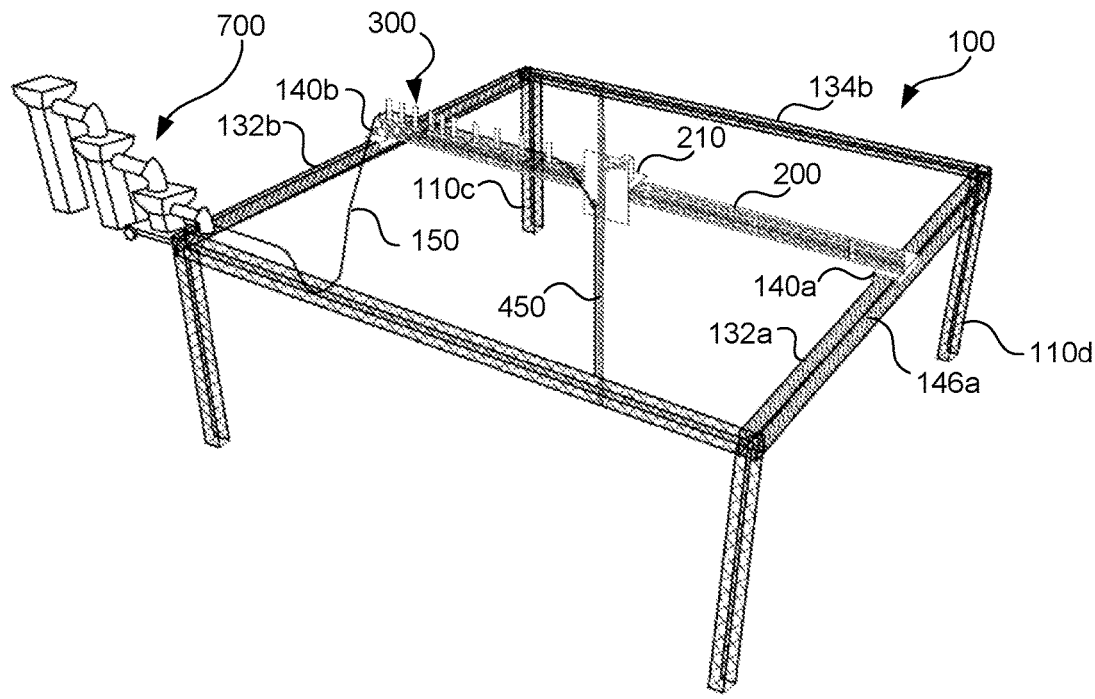
FIG. 6 is a perspective view of an example additive manufacturing apparatus in accordance with the present disclosure.

Referring to FIG. 6, some embodiments of an exoskeleton 100 are depicted. Some embodiments of printing material generation system 700 are depicted. Printing material generation system 700 may incorporate one or more pipes, dispensers, hoppers, motors, pumps, or nozzles 500 to facilitate the automated transfer of cementitious material or printable material for the printer, which may increase the rate at which printing may occur. Legs 110a, 110b, 110c, and 110d may provide support for the upper frame exoskeleton 100. A first y-axis member 132a may be positioned substantially parallel to a second y-axis member 132b and a first x-axis member 134a may be aligned substantially parallel to a second x-axis member 134b. In one example, an outflow outlet of printing material generation system 700 may operably deliver cementitious material or printable material via hose 150. A hose support system 300 can provide moveable support to the delivery hose 150. A first y-axis carriage 140a may be coupled to one or more motors and may include a set of pulleys and may include at least one toothed-pulley that may be coupled to a timing belt 146a that may be stretched along a corresponding y-axis beam; the one or more motors a second y-axis carriage 140b may be configured like the first y-axis carriage 140a and may be coupled to an x-beam that is parallel to the first y-axis beam. X-axis gantry 200 may have a first x-axis carriage 210 operably and slidably coupled to the x-axis gantry 200 that may move along x-axis gantry 200. Z-axis member 450 may be substantially vertically aligned and may be coupled to hose 150. Although not shown in FIG. 6, z-axis member 450 may be telescoping.

Figure 7:
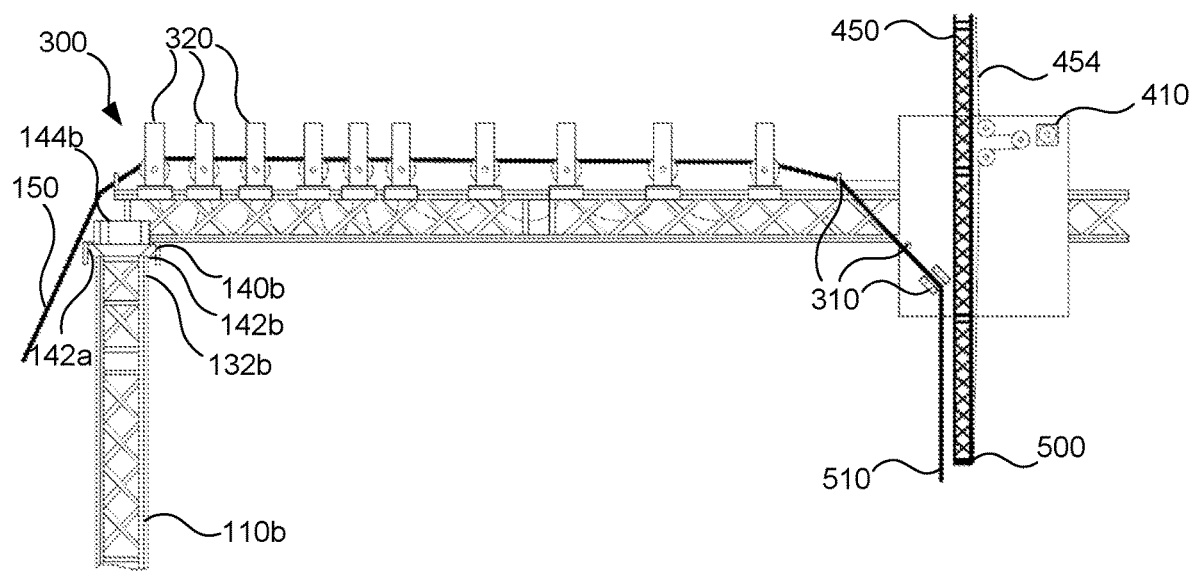
FIG. 7 is a side view of an example additive manufacturing apparatus in accordance with the present disclosure.

Referring to FIG. 7 a portion of some embodiments of exoskeleton 100 are depicted. Some embodiments of leg 110b are depicted. Referring now to FIG. 7, a side of the apparatus is depicted. The trussing of the apparatus may consist of four long poles that are situated to create a rectangular prism. The trussing may be made from aluminum. The delivery hose 150 may be a hose that may deliver a material, such as a cementitious material like concrete, that may be in a variety of colors or properties. Various embodiments of the present invention may be used to transport and deposit any liquid or semiliquid material. The delivery hose 150 may be elongated along the x-axis. Delivery hose 150 may also be aligned to the center of a plurality of trolley units 320. Flange 310 may be configured to assist the hose with the 90 degree bend; flange 310 may be aligned next to 4 wheels that are facing inward so that a hose may pass through flange 310 and along motor pulley 340 for pulling a hose; in some embodiments, a motor may cause one or more pulleys to rotate, the pulleys being in frictional contact with the hose such that the rotation of the pulleys cause the hose to move. In other embodiments, the printhead provides all of the pulling force on the hose. In some embodiments, trussing can be substantially light-weight, when compared to a flat panel that does not have gaps; in some embodiments the trussing may have gaps between the structural support bars forming the trussing, which may allow for wind to travel through the structural support bars. Each individual trolley unit may be coupled by a leash 330 to an adjacent trolley unit; the function of the leash is to allow the coordinate movement of a trolley, such that when a first trolley unit is moved laterally along the x-axis gantry, then the adjacent trolley, which is coupled by a leash to the first trolley unit, may then be dragged by the first trolley unit via the leash. The lengths of a leash are such that when the trolley units are evenly spaced along the x-axis gantry, than the total length of all the leashes, when taut, is at least as great as the total distance between the trolley units. As shown in the figures and in some embodiments, a leash coupling two adjacent trolley units forms a U-shape when two adjacent trolley units are relatively close to each other, and when the two adjacent trolley units are relatively far from each other, then the leash coupling the two adjacent trolley units is linearly taut.

In some embodiments, one or more carriages are frictionally coupled, via one or more wheels, to rails or beams. In some embodiments, a carriage may have a first set of wheels and a second set of the wheels; the first set of wheels may be substantially parallel to the second set of wheels; each set of wheels may have two wheels, and in some embodiments, each set of wheels may have four or more wheels. Each of the wheels may be aligned at an angle; in some embodiments, the wheels may be aligned at an angle, the angle may be between 1 degree and 89 degrees. In some embodiments, the angle of the wheels may be 45 degrees or between 29 degrees to 61 degrees. In some embodiments, the carriage has four wheels on each side. The center carriage on the gantry may have a vertical plate 510 that extends above and below the gantry because on the bottom there may be a plurality of wheels such as four wheels. The bottom of the trussing of the x-axis member may be coupled to one or more wheels, and above the central trussing beam, there may be a series of one or more wheels, and on the opposing side of the gantry there may also be one or more wheels, such that the bottom edge of the gantry and the top two edges of the gantry may be coupled to a plurality of wheels.

Three or more pulleys may form a pulley system or a pulley subsystem; some embodiments of a pulley system or a pulley subsystem are arranged such that a pulley is located at each of vertices of a reference triangle, wherein in some embodiments two of the three pulleys are inner pulleys located nearer to the z-axis member than a first outer puller, wherein a timing belt 454 may traverse across the inner side and upper side of a first inner pulley and around the outer side of the outer pulley and then over to the underside and inner side of a second inner pulley by a z-axis motor 410, such that the torque of the timing belt is increased compared to an arrangement of a timing belt circulating around two pulleys. Proximity sensors, which sense via perceived distance or mechanical contact, may be located on the timing belt, on the z-axis carriage, or on the z-axis member, such that the proximity sensors may sense the presence of a carriage, telescoping unit, or timing belt, such that the proximity sensors may be provide usable information about the position of the timing belt and thus the printhead in 3D space.

The plurality of trolley units may each hold a rotatable wheel that may allow the delivery hose to rest on the trolley units. The delivery hose may also be aligned to the center of the trolley units, which may be coupled with the x-axis gantry. The trolley units may also be aligned along the x-axis gantry of the exoskeletal support system; each of the trolley units may move along the x-axis beam; and in some embodiments the trolley units may move separately, such that the distance between each of the trolley units may vary as the delivery hose moves along the upper surface of the trolley units. Trolley unit assembly refers to all of the trolley units.

Figure 8:
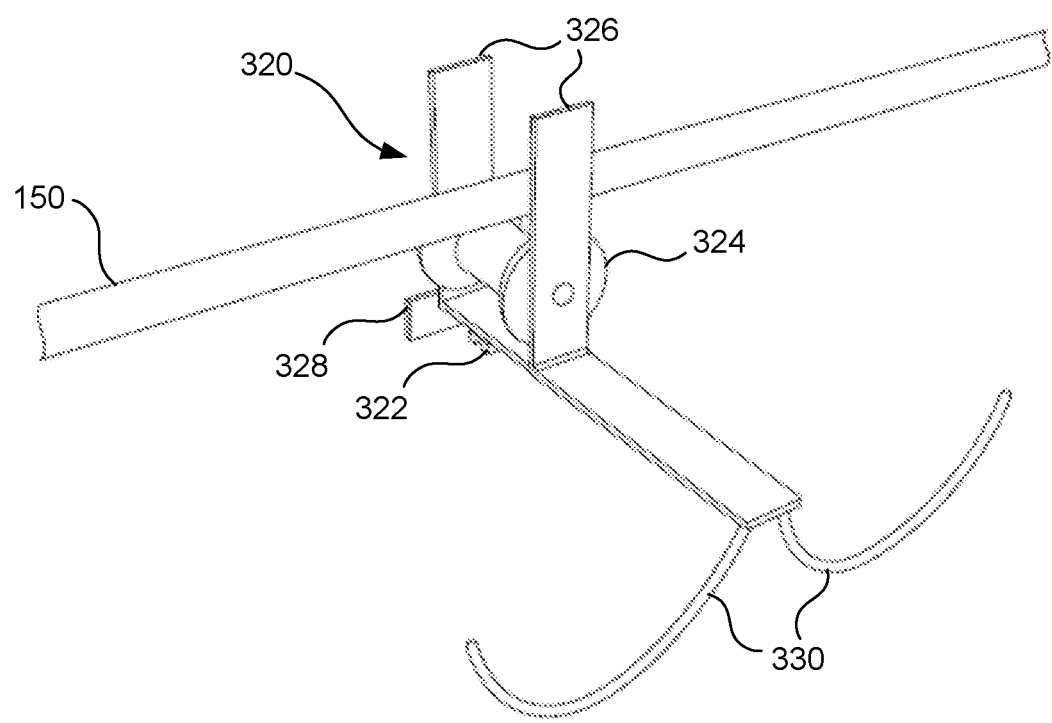
FIG. 8 is a perspective view of an example trolley unit in accordance with the present disclosure.

As shown in FIG. 8 a first guide fin 326 and a second guide fin 326 may be aligned with the hose support wheel 324 so as to provide a barrier on each side of the delivery hose 150. A plurality of guide fins may form a channel for the hose. Hose support wheel 324 may provide a rotatable surface for the delivery hose 150 such that movement of the delivery hose 150 may cause the hose support wheel 324 to rotate, thereby reducing the frictional force acting to hinder the movement of a hose that is being pulled across the hose support wheel 324.

Spacer 328 may be a flange that extends beyond the lateral width of the hose support wheel 324, thereby increasing the space between a first support wheel 324 of a first trolley unit and a second support wheel 324 of a second trolley unit. Each trolley unit may have a spacer on any side that is facing a trolley unit; for example, when there are three trolley units aligned linearly such that a first trolley unit to the left side is adjacent to a second trolley unit located in the middle of the three trolley units and is adjacent to a third trolley unit, then the middle trolley unit has a spacer on a first end and a spacer on a second end, such that the spacer on the first end functions as a barrier between the first trolley unit and the second trolley unit located in the middle of the three trolley units, such that the spacer on the second end of the middle trolley unit functions as a barrier between the middle trolley unit and the third trolley unit. In these embodiments, the number of trolley units aligned on the x-axis gantry can be between three trolley units and three hundred trolley units.

A wheel frame, which may have an I-shaped end surface, and another wheel frame, which may have an I-shaped end surface, may surround the wheels. An x-axis gantry may be coupled to a first set of wheels and a second set of wheels; the wheel frames may be coupled to the vertical plate. The vertical plate may be coupled to one or more sliding blocks; in some embodiments, the vertical plate is coupled to a first sliding blocks set comprising a plurality of sliding blocks which are linearly aligned with each other and collectively parallel to a second sliding blocks set of sliding blocks which are linearly aligned with each other and collectively parallel to the first set of sliding blocks. A first linear guide rail may be mounted to the z-beam while also being slidably coupled to the first sliding blocks set. A second linear guide rail may be mounted to the z-beam while also being slidably coupled to the second sliding blocks set. Sliding blocks may have a central surface comprising a plurality of bearings such that, in some embodiments, the first sliding blocks set and the second sliding blocks set are kept at a fixed vertical position while the linear guide rails are slid across the bearings of the slide blocks, thereby actuating a change in vertical position of the z-beam, with respect to the ground. In some embodiments, the z-beam is moved by a motor system comprising at least one motor (such as a stepper motor), one or more pulleys (such as at least 3 or five pulleys), and one or more timing belts. In some embodiments, the z-beam is kept at a level vertical position while a telescoping unit coupled to the z-beam extends or retracts, thereby allowing for the deposition of cementitious material at various vertical heights. In some embodiments, a control system controls or synchronizes the movement of the z-beam by controlling the number of rotations of at least one motor of a motor system comprising the least one motor (such as a stepper motor), one or more pulleys (such as at least 3 pulleys), and one or more timing belts, while at the same time controlling the telescoping motion of a telescoping unit coupled to the z-beam, wherein the telescoping unit may be coupled to a hose and nozzle. A tension band may run along the horizontal length of an x-axis gantry. A motor with axle may be coupled, which may be via a band, to a pulley, then a band may be coupled to the second pulley, then an axle may be coupled to a third pulley. The belt may be moveable and may move and be engaged with a toothed pulley after bending back via two backbend pulleys. Any two of the three pulleys may be backbend pulleys, and any pulley described herein may be toothed or may not be toothed. The belt is moved and engages the toothed pulley after bending back via the two backbend pulleys.

A z-axis motor may have a spindle coupled to a driving pulley, which may be coupled to a timing belt, and the timing belt may also be coupled to a pulley system, which in some embodiments may include at least four pulleys, and such that the rotation of the motor actuates the rotation of a spindle, which may cause the timing belt to be rotated, such that the rotation of the timing belt, which is attached to the z-axis member, may cause the z-axis member to move in the vertical direction, such as upwards. When the motor causes the spindle to rotate in the opposite direction, then the z-axis member is moved in the opposite direction, such as downwards.

A delivery hose may be coupled to a lower pulley; on either side of the lower pulley may be disposed a wheel; above the lower pulley may be an upper pulley flanked by a pair of fins; this arrangement may allow for support of a substantially 90 degree bend in the hose.

The system can include a plurality of cords or wires protected in a flexible cord cover or a belt.

A vertical plate motor may be coupled to a driving pulley wherein the driving pulley may be directly coupled to the vertical plate motor or may be indirectly coupled to the vertical plate motor, as the vertical plate motor is connected to a pulley through the plate, and the pulley is coupled via a timing belt or belt to spindle or pulley that is on the opposite side (through the plate) of an adjacent pulley.

In some embodiments, a cord coupled to a stepper motor allows for the extension and contraction of a telescoping tube with the assistance of gravity moving the distal end downward and the tautness of the cord determining the height of the distal end. The z-beam can be coupled directly or indirectly to a hose, nozzle, couplers, and a printhead. In some examples, a motor may be disposed between any sections of a hose or couplers.

In some examples, a printing nozzle can be a seven-inch single pass nozzle, which may also be a printhead, is depicted; other nozzles may be used. A seven-inch single pass nozzle would be capable of printing sections that are 7 inches wide in the direction perpendicular to the direction of travel by the printhead. In some examples, a nozzle may have two output ports. Printing via two output ports would allow printing of the inside and outside sections of a hollow wall.

In some examples, a printing material generation system may have a first mixer configured for mixing substantially dry materials, a first mixer vertical elevator, a second mixer configured for mixing substantially wet materials, a wet mix vertical elevator, a wet pump, wherein the wet pump is coupled to the delivery hose.

A dry-wet mixer configured to mix dry and wet materials in stages or simultaneously may receive the input of materials and then produce a mixed output of materials which are delivered via a conduit to a wet pump coupled to a delivery hose.

A variable control system can be communicatively coupled to one or more sensors and the sensors provide information to the variable control system in a feedback loop configuration. The variable control system can include a processor or various components that function as a process coupled to a non-transitory storage medium, and the variable control system can be configured to alter the composition of the deposition material by adding chemicals, liquids, or other materials. Such may be accomplished by separate dispensers controlled by the variable control system to increase or decrease the amount of each additive in the curable material.

Sensors may be any type of environmental or ambient condition sensor. For example, and not by way of limitation, sensors may include one or more temperature sensors, humidity sensors, viscosity sensors, wind sensors, pressure sensors, concrete moisture sensors, etc.

Sensors may be communicatively coupled to an interface of the variable control system. The input of sensors may be used to alter the speed of one or more dispenser, such as a dry mixer dispenser and a wet mixer dispenser; a control system may then send commands to a dry mix dispenser or a wet mix dispenser. In some embodiments of the present invention, the communication between sensors and variable control system are some sort of wireless communication protocol with the communication process being conducted by an interface. However, in certain applications, wired communication links may be used to communicatively couple sensors to the interface of the variable control system. In this case, the interface can include wiring jacks, lugs, or other means of physically connecting wires to the variable control system via the interface.

Control elements may be any type of environmental or ambient control mechanism. For example, and not by way of limitation, control elements may include one or more water vapor misting systems, heating, or cooling elements, etc.

Regardless of the communication protocol or connectivity solution employed, sensors and control elements can work as a feedback mechanism to control various aspects of the overall system, thereby ensuring that the finished product meets the production standards for a given admixture.

For example, a temperature sensor and a humidity sensor may be positioned to provide feedback to the variable control system regarding ambient temperature and humidity conditions in the location where the admixture may be deposited. If the temperature and/or humidity in the environment is suboptimal, control elements may be activated to increase or decrease the ambient temperature or raise or lower the amount of humidity in the workspace where the admixture may be deposited.

Similarly, if the viscosity of the admixture is too thick or too thin, as detected by a sensor, the rate of deposition of the admixture may be increased or decreased to ensure proper deposition of the admixture.

In extreme cases, where the integrity of the structure may be compromised based on the ambient conditions, feedback from sensors may result in a cessation of deposition for the admixture to allow time for intervention and corrective action to be taken. Additionally, if controlling the environment of the construction location is not possible (e.g., large unenclosed spaces subject to various weather conditions), variable control system may be used to alter the composition of the deposition material so as to slow down or increase the curing time, for example. Similarly, the admixture may be adapted by the variable control system for multiple applications, depending on and in response to the conditions. The variable control system may be configured to control the printing process and the composition of the deposition material, which may be termed a mortar, by altering the composition, temperature, flow rate, and viscosity of the supply of the deposition material. To achieve the proper level of control, sensors may be located at various locations in the area surrounding the location for the deposition of the deposition materials, such as near ground level, near the next location of the printhead, or at a location that anticipates the impending location of the printhead. Regarding the sensor system, sensors may be disposed on the Z-beam, the nozzle, or the printhead. A device that can warm or cool down with a fan or spray a mist or remove humidity and may be near the nozzle. A GPS unit may be added for geofencing the usable location of the printer.

The vertical length of the z-axis member may be gravity controlled. A stepper motor may pull a cord attached to the printhead to shorten the telescoping length. Gravity may cause the telescoping z-axis member to be as long as its full length. The telescoping member can include tubes that are each smaller than the previous, such as with gasketing or a sealed fit.

Since the first pass is usually the lowest, as the additive manufacturing system prints, the additive manufacturing system may wind a cord, band, or timing band to a sufficient distance to raise the nozzle and printhead one layer height. The pressure in the hose and tube, as well as gravitational forces, may cause the printhead to stay the maximum length allowed by the amount of cord unrolled. A belt or timing belt, that may be coupled to one or more pulleys, one or more gears, or one or more motors, may be attached to the telescoping beam, which may be a telescoping tube. The delivery hose may travel along the side of the telescoping tube; the delivery hose may be coupled directly or indirectly to the telescoping tube.

The telescoping beam may be mounted on a vertical plate; the telescoping beam may comprise nesting tubes of progressively smaller diameter, having a mount on the lower end for a hose or printhead to be attached; the telescoping beam may also have a mount on the side opposite the hose for a cord or band to attach, which is connected to a winding or rotating motor on the higher end, to reel it in or move the band (when, in some examples, the band has teeth like the timing belt) to raise the lower end of the beam, with gravity and the tautness of the band dictating the vertical height.

The disclosed additive manufacturing system may be capable of printing around vertical rebar and may use a modular system for supplying concrete to the printhead. The printhead may be mounted on a z-axis member that may be extendable in the vertical direction; the z-axis member may travel horizontally along a horizontal cross beam, which may be termed the x-axis gantry. The printhead may be configured to move vertically up-and-down to print both more closely to the rebar and allows the horizontal cross beam, which is on tracks at the top of the printer structure, to clear vertical rebar. The x-axis gantry may be at substantially fixed vertical height during printing mode and, in some embodiments, does not move vertically as the cementitious layers being printed increase in height. The z-axis member assembly, which may include a z-axis member, may be attached to rails on a carriage which is attached to a separate set of rails on the horizontal crossbeam.

To accomplish this movement of the z-axis member, a hose management solution can be included. Some embodiments of the additive manufacturing system use a hose of fixed length which may be directly coupled to the nozzle of the printhead. The hose may travel through a channel system on the z-axis member, and then across an extendable and contractible trolley unit system, in which the trolley units have one or more wheels in a wheel unit, and the trolley units are configured to move across the top surface of the horizontal cross beam. Each trolley unit may have one or more wheels that are slidably coupled to a rail of the x-axis gantry. A set of spacers may be positioned at the edges of a trolley unit to prevent the rail-riding wheels from contacting each other and locking up; in some embodiments, a trolley unit may have a set of one or more wheels that are located at the bottom of the trolley unit and frictionally slide across the x-axis gantry, a rail in proximity of the x-axis gantry, or a rail coupled to the x-axis gantry; in some embodiments, the upper, central surface of the trolley unit may have at least one wheel, bearings, or bearing blocks upon which the hose may slide across. The upper, central surface of the trolley units in conjunction with one or more of the other upper central surfaces of an additional trolley unit may form a channel, and at least one fin, at least one flange, or at least one guide may be aligned along the channel and may serve as a barrier that prevents the hose from sliding off the trolley units. The wheel units are attached to each other via a chain or leash, with one end attached to the z-axis carriage and one to the end of the horizontal crossbeam where the hose makes contact with the printer.

An additional hose management device which is located at that point of contact may be used which further reduces shaking of the printer as the hose coils and uncoils on the ground. This device is either pulley or motor driven and moves the hose at a steady rate towards or away from the printer.

The printer's frame may be made of aluminum stage-trussing, which may allow for easier transportation and set-up/teardown, and also may allow wind to pass through the structure without shaking or moving the printer structure, which would impact the printhead's path.

Additionally, the use of aluminum stage-trussing which has rounded poles in each corner of a beam may allow the horizontal cross member to utilize, instead of rails, a wheeled carriage that has wheels which interact with those rounded corner poles at a 30 to 60 degree angle, such as about a 45-degree angle on each of the top two corners. The connection pins for the stage-trussing are selected to extrude as little as possible, and the connections of the trussing may be machined to allow smooth movement of the horizontal crossbeam's carriage. Trussing made of other lightweight materials may also be used.

The material mixing process may include a concrete mixer, elevator, water additive hopper, second elevator, and cement pump which is coupled to the hose. Above each discrete mixer may be a dispenser capable of dispensing dry or wet additives at any point in the mixing process. This may be controlled manually or by the control system of the printer.

Coupled means to be in direct or indirect contact with another object; in some embodiments two or more objects that are coupled may be affixed by some type of physical or nonphysical means such as glue, screw, nail, mating connections, soldering, which also includes being detachably affixed, which means that a relatively temporary means may be used to affix the two or more objects. Nonphysical means include magnetic forces. Detachably coupled refers to temporary coupling such as a ball bearing to a surface where the physical contact between the two objects may be easily removed by gravity or other weak force. As mentioned above, indirect coupling includes Object A being coupled to Object B and Object C being coupled to Object B may mean that Object A may be coupled to Object C even if Object A may not be physically contacting Object C. Additional elements may be coupled to each other in this manner.

The components of the apparatuses and systems for additive manufacturing, as described with reference to the drawings herein, are implementable in a wide variety of different configurations. Thus, the following more detailed description of the embodiments of the system and method of the present invention, are not intended to limit the scope of the invention, but merely a representative of various embodiments of the invention. Unless explicitly stated, the use of "or" means and/or, that is, this the non-exclusive meaning of "or."

For purposes of this disclosure, the additive manufacturing system may also be referred to as a 3D printer or large scale 3D printer or construction printer. The additive manufacturing system may be deployed to deposit a wide variety of deposition materials and may be configured to "print" or "extrude" these materials using control software and supporting components that work in unison including: a pre-mixer; a water distribution mixer; a pumping system: a hose; and may use a stationary or 360 degree rotating head for large and small scale construction with a myriad of different mix formulas, from concrete, foamcrete, hempcrete, geopolymer, epoxy, resin, and other cementitious or similar materials used in the construction of buildings and other items. The described embodiments are to be considered in all respects only as illustrative and not restrictive.

Additional Examples

The following enumerated examples describe example apparatuses for additive manufacturing.

Example 1. An apparatus for additive manufacturing, comprising:
 a supply of dry cement powder having an individually controllable outlet;
 a supply of a dry mineral filler having an individually controllable outlet;
 a supply of a curing accelerator having an individually controllable outlet;
 a supply of water having an individually controllable outlet;
 a batch mixer to receive and mix a controlled amount of dry cement powder from the supply of dry cement powder, a controlled amount of dry mineral filler from the supply of dry mineral filler, a controlled amount of curing accelerator from the supply of curing accelerator, and a controlled amount of water from the supply of water, thus forming a batch of cementitious material;
 a pump connected to the batch mixer to pump the cementitious material;
 a delivery hose connected to the pump to deliver the cementitious material pumped by the pump from the mixer; and
 a printhead connected to an outlet of the delivery hose, wherein the printhead is positionable in three-dimensional space.

Example 2. The apparatus of example 1, further comprising a control system configured to change the controlled amount of dry cement powder, or the controlled amount of dry mineral filler, or the controlled amount of curing accelerator, or the controlled amount of water, or a combination thereof, in order to change a property of the batch of cementitious material.

Example 3. The apparatus of any of examples 1-2, further comprising an environmental sensor communicatively coupled to the control system to measure an environmental condition, wherein the control system is configured to change at least one of the controlled amounts in response to a change in the environmental condition.

Example 4. The apparatus of example 3, wherein the environmental sensor comprises a temperature sensor, a humidity sensor, a viscosity sensor, a wind sensor, a pressure sensor, a concrete moisture sensor, or a combination thereof.

Example 5. The apparatus of example 3, wherein the change in environmental condition is a decrease in temperature and the control system is configured to increase the controlled amount of curing accelerator in response.

Example 6. The apparatus of example 3, wherein the change in environmental condition is an increase in temperature and the control system is configured to reduce the controlled amount of curing accelerator in response.

Example 7. The apparatus of example 3, wherein the change in environmental condition is a decrease in humidity and the control system is configured to increase the controlled amount of water in response.

Example 8. The apparatus of example 3, wherein the change in environmental condition is an increase in humidity and the control system is configured to reduce the controlled amount of water in response.

Example 9. The apparatus of any of examples 1-8, further comprising a supply of curing retarder having an individually controllable outlet, a supply of plasticizer having an individually controllable outlet, a supply of polymer having an individually controllable outlet, a supply of fibers having an individually controllable outlet, a supply of water repellent additive having an individually controllable outlet, a supply of colorant having an individually controllable outlet, or a combination thereof.

Example 10. The apparatus of any of examples 1-9, wherein the dry mineral filler comprises sand, clay, gravel, crushed stone, quartz, glass, limestone, or a combination thereof.

Example 11. The apparatus of any of examples 1-10, wherein the supply of dry cement powder, or the supply of dry mineral filler, or both, comprise a hopper with the individually controllable outlet below the hopper.

Example 12. The apparatus of any of examples 1-11, wherein the curing accelerator is a dry powder or a liquid.

Example 13. The apparatus of any of examples 1-12, further comprising a conveyor belt positioned to carry dry ingredients from the individually controllable outlets to the batch mixer.

Example 14. The apparatus of example 13, wherein the conveyor belt is an inclined cleated conveyor belt.

Example 15. The apparatus of examples 13 or 14, wherein the conveyor belt further comprises a scale to weigh dry ingredients on the conveyor belt.

Example 16. The apparatus of any of examples 1-15, wherein the batch mixer comprises a dry pre-mixer to mix dry ingredients and a water distribution mixer downstream of the dry pre-mixer, wherein the individually controllable outlet of the water supply is connected to the water distribution mixer.

Example 17. The apparatus of example 16, further comprising a liquid additive supply having an individually controllable outlet connected to the water distribution mixer.

Example 18. The apparatus of any of examples 1-17, wherein the batch of cementitious material has a volume from about 1 cubic foot to about 20 cubic feet.

Example 19. The apparatus of any of examples 1-18, wherein the pump is connected to the batch mixer by a feed hopper positioned to receive the cementitious material from the batch mixer.

Example 20. The apparatus of example 19, wherein the pump further comprises an auger beneath the feed hopper to drive the cementitious material through the delivery hose.

Example 21. The apparatus of examples 19 or 20, wherein the pump further comprises a scale to weigh the cementitious material in the feed hopper, and wherein the apparatus further comprises a control system connected to the scale and to the individually controllable outlets and the batch mixer, wherein the control system is configured to automatically mix an additional batch of cementitious material when the scale detects a weight of cementitious material in the feed hopper below a predetermined threshold.

Example 22. The apparatus of any of examples 1-21, wherein the delivery hose includes an inner hose for delivering the cementitious material and an outer hose around the inner hose, wherein the outer hose is configured to flow a thermal regulation fluid to regulate the temperature of cementitious material in the inner hose.

Example 23. The apparatus of example 22, wherein thermal regulation fluid comprises water or air and wherein the thermal regulation fluid cools the cementitious material in the inner hose.

Example 24. A method of additive manufacturing, comprising:
selecting individually controlled amounts of dry cement powder, dry mineral filler, curing accelerator, and water to mix in order to form a batch of cementitious material having a desired property;
dispensing the controlled amounts of dry cement powder, dry mineral filler, curing accelerator, and water to a batch mixer;
mixing the dry cement powder, dry mineral filler, curing accelerator, and water in the batch mixer, thus forming a batch of cementitious material;
three-dimensional printing a portion of a structure using the cementitious material;
repeating the selecting, dispensing, mixing, and three-dimensional printing, wherein at least one of the controlled amounts is changed in order to change a property of the cementitious material.

Example 25. The method of example 24, wherein the three-dimensional printing is performed by pumping the cementitious material through a delivery hose to a printhead and controlling the position of the printhead in three-dimensional space.

Example 26. The method of any of examples 24-25, wherein the three-dimensional printing comprises printing multiple stacked horizontal layers of the cementitious material.

Example 27. The method of example 26, wherein the desired property of the cementitious material comprises a curing speed such that a printed layer of the cementitious material cures sufficiently to support subsequent layers of the cementitious material that are stacked on top of the printed layer, before the subsequent layers are printed.

Example 28. The method of example 27, wherein the cementitious material has a curing speed such that a first printed layer of cementitious material can support at least one subsequent layer of cementitious material within 5 minutes after the first printed layer is printed.

Example 29. The method of example 27, wherein the cementitious material has a curing speed such that a first printed layer of cementitious material can support at least 10 subsequent layers of cementitious material within 30 minutes after the first printed layer is printed.

Example 30. The method of any of examples 26-29, wherein the cementitious material has a curing speed such that a first printed layer of cementitious material is not fully cured when a subsequent layer is printed in contact with the first printed layer, such that the subsequent layer bonds with the first printed layer.

Example 31. The method of any of examples 26-30, wherein the layers are printed at a rate from 1 layer per hour to 10 layers per minute.

Example 32. The method of any of examples 26-31, wherein the layers have a layer height from about 0.25 inch to about 5 inches.

Example 33. The method of any of examples 26-32, further comprising inserting an insert into the structure before the layers are fully cured.

Example 34. The method of example 33, wherein insert comprises rebar, metal mesh, a structural tie, an electrical outlet box, a window frame, a plumbing component, or a combination thereof.

Example 35. The method of example 33, wherein the structure includes a double wall made up of two parallel stacks of layers, wherein the insert is a structural tie to structurally maintain a spacing between the two parallel stacks of layers, wherein the structural tie is inserted by placing the structural tie on top of a printed layer before a subsequent layer is printed over it.

Example 36. The method of example 33, wherein inserting the insert comprises cutting a hole in the multiple stacked layers of cementitious material before the cementitious material has fully cured, and placing the insert in the hole.

Example 37. The method of example 36, wherein hole is cut by pressing or hammering a cutting template having the shape of the hole into the stacked layers of cementitious material.

Example 38. The method of any of examples 24-37, further comprising finishing a surface of the structure by smoothing or texturing the printed cementitious material before the cementitious material has fully cured.

Example 39. The method of any of examples 24-38, wherein the at least one controlled amount is changed by a control system configured to change the controlled amount of dry cement powder, or the controlled amount of dry mineral filler, or the controlled amount of curing accelerator, or the controlled amount of water, or a combination thereof, in order to change a property of the batch of cementitious material.

Example 40. The method of example 39, further comprising measuring an environmental condition using an environmental sensor communicatively coupled to the control system, wherein the control system is configured to change at least one of the controlled amounts in response to a change in the environmental condition.

Example 41. The method of example 40, wherein the environmental sensor comprises a temperature sensor, a humidity sensor, a viscosity sensor, a wind sensor, a pressure sensor, a concrete moisture sensor, or a combination thereof.

Example 42. The method of example 40, wherein the change in environmental condition is a decrease in temperature and the control system is configured to increase the controlled amount of curing accelerator in response.

Example 43. The method of example 40, wherein the change in environmental condition is an increase in temperature and the control system is configured to reduce the controlled amount of curing accelerator in response.

Example 44. The method of example 40, wherein the change in environmental condition is a decrease in humidity and the control system is configured to increase the controlled amount of water in response.

Example 45. The method of example 40, wherein the change in environmental condition is an increase in humidity and the control system is configured to reduce the controlled amount of water in response.

Example 46. The method of any of examples 24-45, further comprising selecting individually controlled amounts of one or more additives and dispensing the individually controlled amounts of the one or more additives into the batch mixer, wherein the one or more additives comprise a curing retarder, a plasticizer, a polymer, fibers, a water repellent additive, a colorant, or a combination thereof.

Example 47. The method of any of examples 24-46, wherein the dry mineral filler comprises sand, clay, gravel, crushed stone, quartz, glass, limestone, or a combination thereof.

Example 48. The method of any of examples 24-47, wherein dispensing the controlled amounts of dry cement powder and dry mineral filler comprises dispensing from hoppers having individually controllable outlets.

Example 49. The method of example 48, further comprising carrying the dry cement powder and dry mineral filler from the individually controllable outlets to the batch mixer on a conveyor belt.

Example 50. The method of example 49, wherein the conveyor belt is an inclined cleated conveyor belt.

Example 51. The method of examples 49 or 50, further comprising weighing the dry cement powder and dry mineral filler using a scale included in the conveyor belt.

Example 52. The method of any of examples 24-51, wherein the batch mixer comprises a dry pre-mixer to mix dry ingredients and a water distribution mixer downstream of the dry pre-mixer, wherein the water is dispensed into the water distribution mixer.

Example 53. The method of example 52, further comprising dispensing an individually controlled amount of a liquid additive into the water distribution mixer.

Example 54. The method of any of examples 24-53, wherein the batch of cementitious material has a volume from about 1 cubic foot to about 20 cubic feet.

Example 55. The method of any of examples 24-54, wherein the pump is connected to the batch mixer by a feed hopper positioned to receive the cementitious material from the batch mixer.

Example 56. The method of example 55, wherein the pump further comprises an auger beneath the feed hopper to drive the cementitious material through the delivery hose.

Example 57. The method of examples 55 or 56, further comprising weighing the cementitious material in the feed hopper using a scale included in the feed hopper and using a control system connected to the scale to automatically mix an additional batch of cementitious material when the scale detects a weight of cementitious material in the feed hopper below a predetermined threshold.

Example 58. The method of example 25, wherein the delivery hose includes an inner hose for delivering the cementitious material and an outer hose around the inner hose, and wherein the method further comprises flowing a thermal regulation fluid through the outer hose to regulate the temperature of cementitious material in the inner hose.

Example 59. The method of example 58, wherein the thermal regulation fluid comprises water or air and wherein the thermal regulation fluid cools the cementitious material in the inner hose.

The following enumerated examples describe additional example apparatuses for additive manufacturing. The members may interact to control the movement and location of the printhead.

Example 1. An apparatus for additive manufacturing comprising:
a dispensing assembly, which may also be called a printhead;
a hose management apparatus;
a printing material generating system;
a three-dimensional positioning assembly;
a support structure; and,
a control system
wherein the dispensing assembly, which may also be called a printhead assembly, comprises:
a nozzle, which may be rotatable, configured to deliver an amount of curable material;
a delivery hose coupled to the nozzle,
wherein the hose management apparatus comprises:
a plurality of hose guides,
a plurality of trolley units comprising a first trolley unit and a second trolley unit,
wherein the first trolley unit comprises:
a first bearing box,
a first hose support wheel, wherein the first hose support wheel is detachably coupled to
the delivery hose;
a plurality of guide fins, comprising a first guide fin and a second guide fin,
a plurality of spacers, comprising a first spacer and a second spacer;
wherein the second trolley unit comprises a second bearing box;
a second hose support wheel; wherein the second hose support wheel is detachably coupled to the delivery hose;
a plurality of guide fins, comprising a third guide fin and a fourth guide fin;
a plurality of spacers, comprising a third spacer and a fourth spacer;
wherein first trolley unit is coupled to the second trolley unit, in some embodiments by a cable;
a hose lifting device,
wherein the hose management apparatus is coupled to the delivery hose;
wherein the printing material generation system comprises:
a first mixer mixing substantially dry materials,
a first mixer vertical elevator,
a second mixer configured for mixing wet materials,
a wet mix vertical elevator,
a wet pump,
wherein the wet pump is coupled to the delivery hose;
wherein the three-dimensional positioning system comprises:
a z-axis member comprising:
a z-axis rail,
a z-axis timing band,
wherein the z-axis member is coupled to the delivery hose;
a z-axis movement device comprising:
a z-axis motor,
wherein the z-axis motor is coupled to the z-axis timing band;
a plurality of bearing blocks,
wherein the plurality of bearing blocks are coupled to the z-axis rail;

wherein the z-axis movement device is coupled to the z-axis member;
an x-axis gantry comprising:
an x-axis carriage,
an x-axis timing band,
an x-axis motor,
a plurality of x-axis rails,
a plurality of x-axis bearing blocks,
an x-axis wire management assembly,
wherein the x-axis carriage is jointly coupled to the z-axis movement device and the x-axis motor, wherein the x-axis motor is coupled to the x-axis timing band,
wherein the x-axis carriage is coupled to the plurality of x-axis bearing blocks, wherein the plurality of x-axis bearing blocks are coupled to the x-axis rails, wherein the x-axis wire management assembly is coupled to the x-axis gantry;
y-axis carriage comprising:
y-axis wheels,
a y-axis motor,
wherein the y-axis carriages are coupled to the x-axis gantry;
y-axis member comprising:
a y-axis timing band,
a y-axis wire management assembly,
wherein the y-axis member are coupled to the y-axis wheels, wherein the y-axis timing band is coupled to the y-axis motor, wherein the y-axis wire management assembly is coupled to the y-axis member;
wherein the exoskeletal support system comprises:
a plurality of legs,
a plurality of optional levelers,
a plurality of exoskeletal support wheels,
a plurality of support beams,
wherein the exoskeletal exoskeletal support system is coupled to the y-axis member;
wherein the control system comprises:
a computing device,
a power supply,
a plurality of breakers,
wherein the control system (600) is collectively coupled to the printing material generation system, the z-axis motor, the x-axis motor, and the y-axis motor.

Example 2. The apparatus for additive manufacturing of example 1, wherein the nozzle is selected from the group comprising: a double-head nozzle, a single pass head nozzle, which may be seven inches in width, or a stopper-head nozzle.

Example 3. The apparatus for additive manufacturing of example 1, wherein the nozzle is rotated by a rotational motor.

Example 4. The apparatus for additive manufacturing of example 1, wherein the nozzle moves in the z-axis independently from the x-axis gantry.

Example 5. The apparatus for additive manufacturing of example 1, wherein the z-axis member moves in the z-axis independently from the x-axis gantry.

Example 6. The apparatus for additive manufacturing of example 1, wherein the horizontal crossbeam is positioned at fixed height while the z-beam is moved.

Example 7. The apparatus for additive manufacturing of example 1, wherein the z-axis member is capable of telescoping.

Example 8. The apparatus for additive manufacturing of example 7, wherein the z-axis member is comprised of at least two telescoping sections and in some embodiments at least three telescoping sections.

Example 9. The apparatus for additive manufacturing of example 1, wherein the delivery hose is guided along the x-axis gantry from the wet pump to the nozzle via the hose management apparatus.

Example 10. The apparatus for additive manufacturing of example 1, wherein the hose management apparatus is comprised of a plurality of trolley units.

Example 11. The apparatus for additive manufacturing of example 1, wherein the hose management apparatus is comprised of ten trolley units.

Example 12. The apparatus for additive manufacturing of example 1, wherein the delivery hose further comprises ay-coupling joint.

Example 13. The apparatus for additive manufacturing of example 1, wherein the x-axis carriage is coupled to the x-axis gantry via the coupling of the x-axis bearing blocks to the x-axis rails.

Example 14. The apparatus for additive manufacturing of example 1, wherein the x-axis carriage is coupled to the x-axis gantry via the coupling of x-axis wheels to x-axis tracks.

Example 15. The apparatus for additive manufacturing of example 1, wherein the y-axis carriage is coupled to the y-axis beam via the coupling of y-axis bearing blocks to y-axis rails.

Example 16. The apparatus for additive manufacturing of example 1, wherein the y-axis carriage is coupled to the y-axis member via the coupling of the y-axis wheels to the y-axis tracks.

Example 17. The apparatus for additive manufacturing of example 1, wherein the z-axis member, the x-axis member, the y-axis member, the support beams, and the legs are composed of a light-weight material.

Example 18. The apparatus for additive manufacturing of example 1, wherein the z-axis member, the x-axis member, the y-axis member, and the legs are composed of aluminum.

Example 19. The apparatus for additive manufacturing of example 1, wherein the wet pump comprises an auger.

Example 20. The apparatus for additive manufacturing of example 1, wherein the wet pump comprises a hopper. And optional secondary hand mixer.

Example 21. The apparatus for additive manufacturing of example 1, wherein the printing material generation system also comprises a vibration system.

Example 22. The apparatus for additive manufacturing of example 1, wherein the x-axis gantry is coupled to the legs and the y-axis carriages and y-axis member are omitted.

Example 23. The apparatus for additive manufacturing of example 21, wherein the legs are coupled to diagonal supports and the exoskeletal support wheels wherein the exoskeletal support wheels are coupled to a guidance track on the ground.

Example 24. The apparatus for additive manufacturing of example 22, wherein the printing material generation system further comprises a humidity sensor, a thermometer, a water regulator, a water delivery hose, a Y-coupling joint, and separate dispensers for each ingredient additive used to control the qualities of the curable material.

Example 25. The apparatus for additive manufacturing of example 22, wherein the printing material generation system further comprises a component to alter humidity, temperature, and ambient settings.

The invention claimed is:
1. An apparatus for additive manufacturing, comprising:
a supply of dry cement powder having an individually controllable outlet;

a supply of a dry mineral filler having an individually controllable outlet;

a supply of a curing accelerator having an individually controllable outlet;

a supply of water having an individually controllable outlet;

a batch mixer to receive and mix a controlled amount of dry cement powder from the supply of dry cement powder, a controlled amount of dry mineral filler from the supply of dry mineral filler, a controlled amount of curing accelerator from the supply of curing accelerator, and a controlled amount of water from the supply of water, thus forming a batch of cementitious material;

a pump connected to the batch mixer and a hopper to pump the cementitious material, the pump comprising an auger;

a double-walled delivery hose connected to the pump to deliver the cementitious material pumped by the pump from the batch mixer, the delivery hose having an inner hose and an outer hose, the inner hose operable to carry the cementitious material and the outer hose operable to flow a thermal regulation fluid around the inner hose;

a water distribution mixer configured to mix water with dry ingredients, the water distribution mixer connected to an individually-controllable outlet of the water supply; and a printhead connected to an outlet of the delivery hose, wherein the printhead is positionable in three-dimensional space by a three-dimensional positioning system comprising one of more of a robotic arm, a gantry and a carriage.

2. The apparatus of claim 1, further comprising a control system configured to change the controlled amount of dry cement powder, or the controlled amount of dry mineral filler, or the controlled amount of curing accelerator, or the controlled amount of water, or a combination thereof, in order to change a property of the batch of cementitious material.

3. The apparatus of claim 2, further comprising an environmental sensor communicatively coupled to the control system to measure an environmental condition, wherein the control system is configured to change at least one of the controlled amounts in response to a change in the environmental condition.

4. The apparatus of claim 3, wherein the environmental sensor comprises a temperature sensor, a humidity sensor, a viscosity sensor, a wind sensor, a pressure sensor, a concrete moisture sensor, or a combination thereof.

5. The apparatus of claim 3, wherein the change in environmental condition is a decrease in temperature and the control system is configured to increase the controlled amount of curing accelerator in response.

6. The apparatus of claim 3, wherein the change in environmental condition is an increase in temperature and the control system is configured to reduce the controlled amount of curing accelerator in response.

7. The apparatus of claim 3, wherein the change in environmental condition is a decrease in humidity and the control system is configured to increase the controlled amount of water in response.

8. The apparatus of claim 3, wherein the change in environmental condition is an increase in humidity and the control system is configured to reduce the controlled amount of water in response.

9. A method of additive manufacturing with the apparatus of claim 1, comprising:

selecting individually controlled amounts of dry cement powder, dry mineral filler, curing accelerator, and water to mix in order to form a batch of cementitious material having a desired property;

dispensing the controlled amounts of dry cement powder, dry mineral filler, curing accelerator, and water to a batch mixer;

mixing the dry cement powder, dry mineral filler, curing accelerator, and water in the batch mixer, thus forming a batch of cementitious material;

three-dimensional printing a portion of a structure using the cementitious material; and repeating the selecting, dispensing, mixing, and three-dimensional printing, wherein at least one of the controlled amounts is changed in order to change a property of the cementitious material.

10. The method of claim 9, wherein the three-dimensional printing is performed by pumping the cementitious material through a delivery hose to a printhead and controlling the position of the printhead in three-dimensional space.

11. The method of claim 9, wherein the desired property of the cementitious material comprises a curing speed such that a printed layer of the cementitious material cures sufficiently to support subsequent layers of the cementitious material that are stacked on top of the printed layer, before the subsequent layers are printed.

12. The method of claim 11, wherein the cementitious material has a curing speed such that a first printed layer of cementitious material can support at least one subsequent layer of cementitious material within 5 minutes after the first printed layer is printed.

13. The method of claim 11, wherein the cementitious material has a curing speed such that a first printed layer of cementitious material can support at least 10 subsequent layers of cementitious material within 30 minutes after the first printed layer is printed.

14. The method of claim 10, wherein the delivery hose includes an inner hose for delivering the cementitious material and an outer hose around the inner hose, and wherein the method further comprises flowing a thermal regulation fluid through the outer hose to regulate a temperature of cementitious material in the inner hose.

15. The method of claim 14, wherein the thermal regulation fluid comprises water or air and wherein the thermal regulation fluid cools the cementitious material in the inner hose.

* * * * *